United States Patent [19]

Tamaki et al.

[11] Patent Number: 5,504,404
[45] Date of Patent: Apr. 2, 1996

[54] METHOD AND APPARATUS FOR CONTROLLING MOTOR

[75] Inventors: Satoshi Tamaki, Osaka; Yasufumi Ikkai, Kobe; Yasuhiro Kondo, Hirakata, all of Japan

[73] Assignee: Matsushita Electric Industrial Co., Ltd., Osaka, Japan

[21] Appl. No.: 307,061

[22] Filed: Sep. 16, 1994

[30] Foreign Application Priority Data

Sep. 17, 1993 [JP] Japan ................................. 5-232075
Sep. 17, 1993 [JP] Japan ................................. 5-232077
Sep. 17, 1993 [JP] Japan ................................. 5-232080

[51] Int. Cl.$^6$ .................................................. H02P 7/06
[52] U.S. Cl. ...................... 318/432; 318/530; 318/537; 318/719; 318/139
[58] Field of Search .................................. 318/139, 251, 318/375, 381, 432, 493, 521, 530, 536, 537, 712, 715, 716, 719; 388/803, 804

[56] References Cited

U.S. PATENT DOCUMENTS

| 3,845,368 | 10/1974 | Elco ........................................ 318/139 |
| 3,950,684 | 4/1976 | Peterson . | |
| 4,037,144 | 7/1977 | Ohmae et al. ..................... 318/493 X |
| 4,366,420 | 12/1982 | Ohmae et al. ..................... 318/493 X |
| 4,549,122 | 10/1985 | Berkopee et al. . | |
| 4,678,248 | 7/1987 | Depenbrock .......................... 318/805 |
| 5,168,204 | 12/1992 | Schauder ............................... 318/800 |

FOREIGN PATENT DOCUMENTS

503879A2  9/1992  European Pat. Off. .

OTHER PUBLICATIONS

"Flux–Weakening Regime Operation of an interior Permanent–Magnet Synchronous Motor Drive", IEEE Transactions on Industry Applications, vol. IA–23, No. 4, Jul./Aug. 1987, Thomas M. Jahns.

Primary Examiner—Bentsu Ro
Attorney, Agent, or Firm—Wenderoth, Lind & Ponack

[57] ABSTRACT

In a method and an apparatus for controlling a motor, one type or a plurality of types of weakening current are previously set, a first torque command current determined from a speed deviation between a speed command to the motor and the present speed of the motor is compared with torque currents corresponding the torques, so that a second torque command current and a weakening current are determined and outputted depending on which range of the torque currents corresponding the torques the first torque command current falls upon. Thus, the second torque command current and the weakening current can be determined simply and efficiently. According to another method and apparatus, the weakening current and the torque current are determined while the weakening factor is varied as appropriate, on the conditions that the sum of voltage vectors of sections of the motor falls within a restrictive circle that depends on the applied voltage to the motor and that the torque current should be equal to a value resulting from multiplying the torque command current determined from the speed deviation with the weakening factor. Then, the motor can produce the maximum torque with less weakening current, thus being capable of maximum efficiency control.

16 Claims, 19 Drawing Sheets

METHOD AND APPARATUS FOR CONTROLLING MOTOR

BACKGROUND OF THE INVENTION

The present invention relates to a method and an apparatus for controlling a motor, by which, for example, a synchronous motor that serves as a power source of an electromobile is controlled.

Based on the establishment of the vector control theory, it has been common practice that d-axis current (hereinafter, referred to as $I_d$ current) is controlled generally for more efficient control (for example, see "Flux-Weakening Regime Operation of an Interior Permanent-Magnet Synchronous Motor Drive" by Thomas M. Jahns of IEEE Transactions on Industry Applications, Vol. IA-23, No. 4, July/August 1987, and European Patent Publication No. 0 503 879 A2).

Recently, by making aggressive use of the $I_d$ current for the purpose of the control of high-speed range rotation of a motor, the field-weakening control is beginning to be introduced, in which the motor is weakened in effective magnetic flux by the flow of the $I_d$ current so as to be enabled to perform high-speed rotation.

FIG. 21 is a schematic arrangement view of an electromobile. In FIG. 21, there are shown a car body 51, front wheels 52, rear wheels 53, a motor 54, a transmission 55, and a battery 56. A controller 57 receives inputs of an acceleration signal and a brake signal. In this electromobile, the motor 54 is operated with the battery 56 used as an energy source, the drive force of the motor 54 being transferred to the rear wheels 53 via the transmission 55. The motor 54 is controlled by the controller 57.

For electromobiles, the following advantages are obtained by controlling the d-axis current.

Assume that the motor cannot increase its rotational speed beyond a certain value (for example, 5000 rpm). As the electromobile speed becomes higher, the rotational speed of the motor must be made higher in linkage with the wheels. However, since the motor, having reached 5000 rpm, could not increase its rotational speed any more, its transmission is exploited to increase the speed.

This being the case, the d-axis current control (field-weakening control) herein proposed, if effected, allows the motor, which only could rotate up to 5000 rpm without field-weakening control (solid line $A_1$) to be rotatable up to, for example, 10,000 rpm by virtue of effecting the field-weakening control (solid line $A_2$), as shown in FIG. 22. As a result, it can be expected to provide an electromobile without any transmission. In FIG. 22, reference characters $TT_1$ and $TT_1/2$ denote torques while the motor is at rest.

Also, further advantages can be expected, such as reduction in the cost due to the omission of the transmission, and improvement in efficiency due to the effect of the reduction in weight.

Moreover, if proper control is performed, more efficient control is effected, which means that limited energy (battery) serves for more efficiency, such advantages as extended running distances can be expected.

It is noted that if a motor that is rotatable up to 10000 rpm as the motor characteristic was created, the motor would be too large in size, with a greatly increased weight, to be adopted for the electromobile.

However, almost no means has been published for actually realizing the field-weakening control.

SUMMARY OF THE INVENTION

Accordingly, the object of the present invention is to provide a method and an apparatus for controlling a motor, by which field-weakening control is performed so that the motor can be controlled with high efficiency.

In accomplishing these and other objects, according to a first aspect of the present invention, there is provided a method for controlling a motor, comprising:

a step of determining speed-torque characteristics of a motor which is to be controlled, in a state in which no field-weakening current is flowing and in a state in which a field-weakening current is flowing at one level, respectively;

a step of determining a first torque command current by calculation from a deviation between a speed command to the motor and a present speed of the motor;

a step of determining a torque that develops at the present speed in the state in which no field-weakening current is flowing on the speed-torque characteristic and a torque that develops at the present speed in the state in which the field-weakening current is flowing at one level on the speed-torque characteristic, respectively;

a step of calculating torque currents corresponding to the torques determined in the preceding step from the torques and torque constants of the speed-torque characteristics; and a step for comparing the first torque command current determined from the deviation between the speed command to the motor and the present speed of the motor, with the torque currents corresponding to the torques, respectively, and determining and outputting a second torque command current and a field-weakening current depending on whether or not the first torque command current falls upon a field-weakening range of torque currents corresponding to the torques.

According to a second aspect of the present invention, there is provided a method for controlling a motor, comprising:

a step of determining a torque command current by calculation from a deviation between a speed control to a motor which is to be controlled and a present speed of the motor;

a step of determining whether or not a sum of voltage vectors of the motor is within a restrictive circle that depends on an applied voltage to the motor, when the torque command current is set with no field-weakening current flowing and at the present speed; and a step of determining a field-weakening current and a torque current with a field-weakening factor varied, when the sum of the voltage vectors of the motor is out of the restrictive circle that depends on the applied voltage to the motor, on a condition that the sum of the voltage vectors of the motor is within the restrictive circle that depends on the applied voltage to the motor, and that the torque current is made equal to a value resulting from multiplying the torque command current determined from the speed deviation, with the field-weakening factor.

According to a third aspect of the present invention, there is provided an apparatus for controlling a motor, comprising:

a means for determining speed-torque characteristics of a motor which is to be controlled, in a state in which no field-weakening current is flowing and in a state in which a field-weakening current is flowing at one level, respectively;

a means for determining a first torque command current by calculation from a deviation between a speed command to the motor and a present speed of the motor;

a means for determining a torque that develops at the present speed in the state in which no field-weakening current is flowing on the speed-torque characteristic and a torque that develops at the present speed in the state in which the field-weakening current is flowing at one level on the speed-torque characteristic, respectively;

a means for calculating torque currents corresponding to the torques determined in the torque determining means from the torques and torque constants of the speed-torque characteristics; and a means for comparing the first torque command current determined from the deviation between the speed command to the motor and the present speed of the motor, with the torque currents corresponding to the torques, respectively, and determining and outputting a second torque command current and a field-weakening current depending on whether or not the first torque command current falls upon a field-weakening range of torque currents corresponding to the torques.

According to a fourth aspect of the present invention, there is provided an apparatus for controlling a motor, comprising:

a means for determining a torque command current by calculation from a deviation between a speed control to a motor which is to be controlled and a present speed of the motor;

a means for determining whether or not a sum of voltage vectors of the motor is within a restrictive circle that depends on an applied voltage to the motor, when the torque command current is set with no field-weakening current flowing and at the present speed; and a means for determining a field-weakening current and a torque current with a field-weakening factor varied, when the sum of the voltage vectors of the motor is out of the restrictive circle that depends on the applied voltage to the motor, on a condition that the sum of the voltage vectors of the motor is within the restrictive circle that depends on the applied voltage to the motor, and that the torque current is made equal to a value resulting from multiplying the torque command current determined from the speed deviation, with the field-weakening factor.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Before the description of the present invention proceeds, it is to be noted that like parts are designated by like

First Embodiment

A method for controlling a motor according to a first embodiment of the present invention is described with reference to FIGS. 1, 2, and 10.

Figure 1:
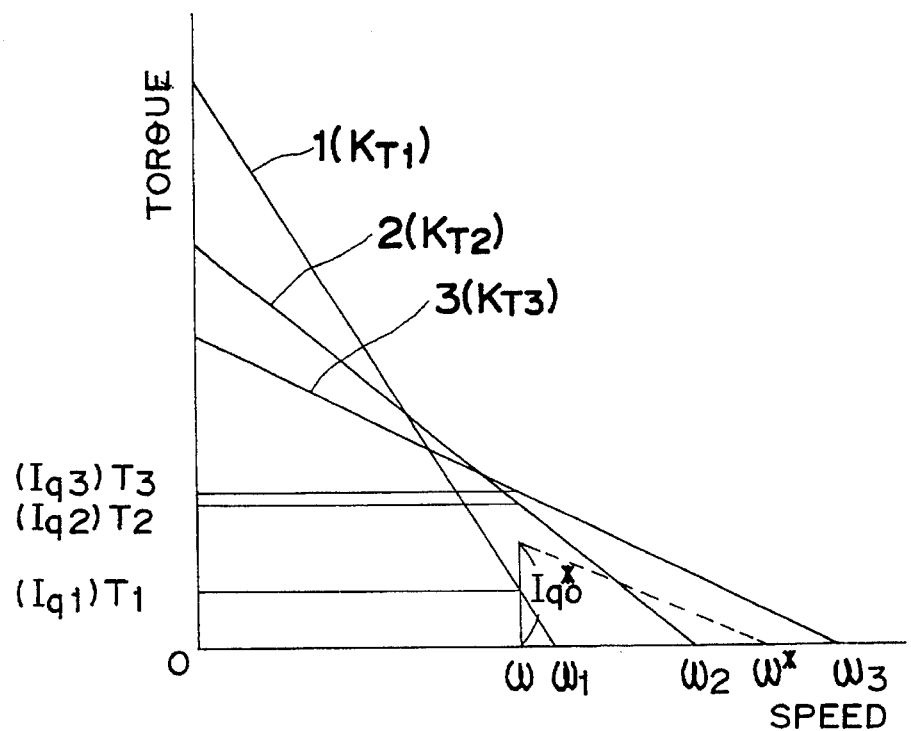
FIG. 1 is a speed-torque characteristic chart showing an algorithm of a method for controlling a motor according to a first embodiment of the present invention.

FIG. 1 is a speed-torque characteristic chart showing the algorithm for determining the weakening current (field-weakening current) of a synchronous motor in the method for controlling a motor according to the first embodiment of the present invention. FIG. 10 is a flowchart of the method. In FIG. 1, numeral 1 denotes a characteristic curve that shows when no weakening current is flowing, i.e., that depends on the battery voltage and the motor constant, where the resultant torque constant and no-load rotational speed of the motor are assumed to be $K_{T1}$ and $\omega_1$, respectively. Numeral 2 denotes a characteristic curve that shows when a weakening current $I_{d1}$ is flowing, where the resultant torque constant and no-load rotational speed of the motor are assumed to be $K_{T2}$ and $\omega_2$, respectively. Numeral 3 denotes a characteristic curve that shows, like the characteristic curve 2, when a weakening current $I_{d2}$ is flowing, where the resultant torque constant and no-load rotational speed of the motor are assumed to be $K_{T3}$ and $\omega_3$, respectively.

Figure 23:
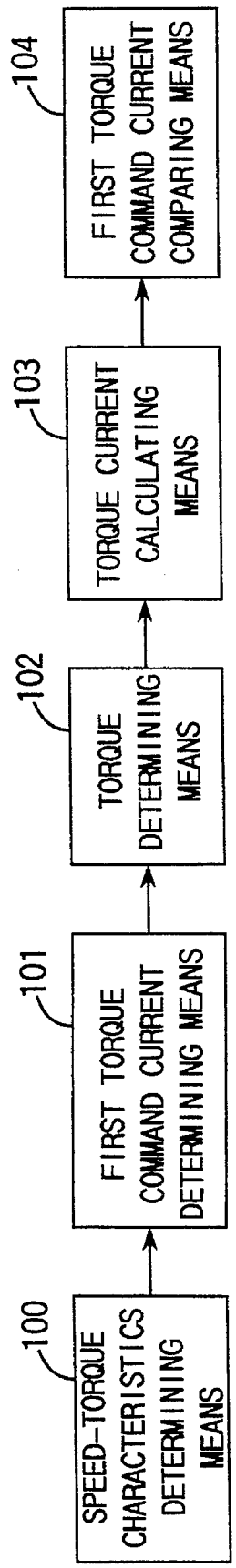
FIG. 23 is a view showing the construction of an apparatus for controlling a motor according to the first embodiment of the present invention.

An apparatus for controlling a motor according to the first embodiment of the present invention which can carry out the method is suitably used for an electromobile. As shown in FIG. 23, the apparatus includes a speed-torque characteristics determining means 100 for carrying out step #1 in FIG. 10, a first torque command current determining means 101 for carrying out step #2, a torque determining means 102 for carrying out step #3, a torque current calculating means 103 for carrying out step #4, and a first torque command current comparing means 104 for carrying out steps #5–#9.

Now the algorithm for determining the weakening current of the motor is described below.

First, from a deviation between a speed command $\omega^*$ and the present speed $\omega$, a torque command current $I^*_{q0}$ is determined by calculation.

The level of this torque command current $I^*_{q0}$ is $I^*_{q0}$ in FIG. 1, and the broken line in the figure has a slope that depends on the magnitude of the speed gain. It is noted that the figure is approximated by a straight line for an easier understanding of the explanation.

Figure 10:
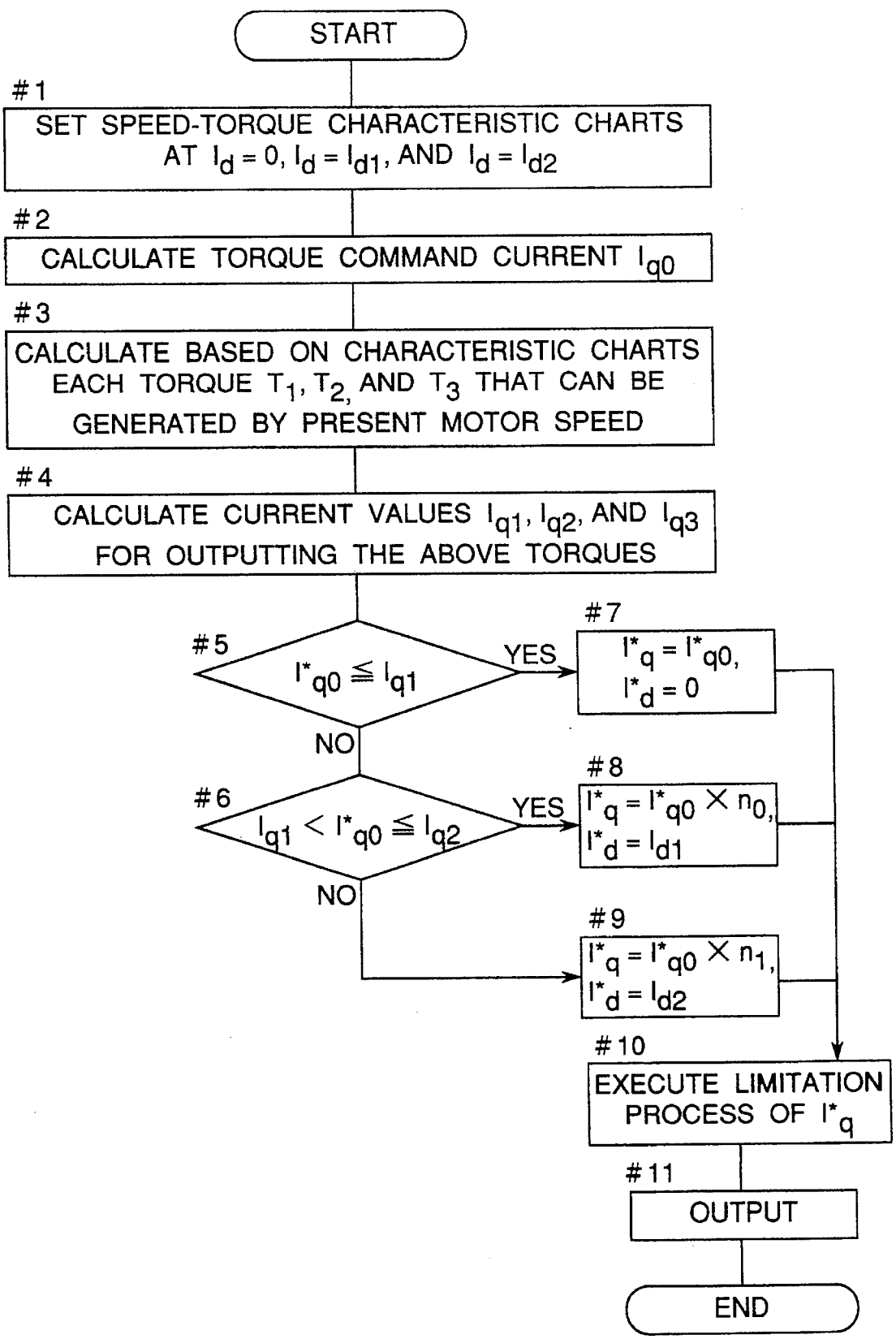
FIG. 10 is a flowchart of the method of the first embodiment.

Next, the torque generated at the present speed $\omega$ is determined from the characteristic curves 1, 2, and 3 at step #1 in FIG. 10. From FIG. 1, the torque for characteristic curve 1 is $T_1$, the torque for characteristic curve 2 is $T_2$, and the torque for characteristic curve 3 is $T_3$.

The relationship among torque constant $K_t$, torque T, and torque current i is given by Eq. 1. Therefore, from the torque constants $K_{T1}$ to $K_{T3}$ of the characteristic curves 1, 2, and 3 and the then resulting torques $T_1$ to $T_3$, and necessary torque currents $I_{q1}$ to $I_{q3}$ are calculated by using Eq. 2.

$$T=K_t \times i \qquad \text{(Eq. 1)}$$

$$I_{q1}=T_1/K_{T1},\ I_{q2}=T_2/K_{T2},\ I_{q3}=T_3/K_{T3} \qquad \text{(Eq. 2)}$$

Then, by comparing the torque command current $I^*_{q0}$ determined from the speed deviation at step #2 and the levels of the torque currents $I_{q1}$ to $I_{q3}$ that can be generated at the present speed at step #3 with each other, the weakening current $I^*_d$ and the torque command current $I^*_q$ are determined according to the following conditions at steps #4–9 and outputted at step #11.

(1) $I^*_{q0} \leq I_{q1}$
    torque command current: $I^*_q = I^*_{q0}$
    weakening current: $I^*_d = 0$ (2) $I_{q1} < I^*_{q0} \leq I_{q2}$
    torque command current: $I^*_q = I^*_{q0} \times (\omega_2/\omega_1)$
    weakening current: $I^*_d = I_{d1}$ (3) $I_{q2} < I^*_{q0}$
    torque command current: $I^*_q = I^*_{q0} \times (\omega_3/\omega_1)$
    weakening current: $I^*_d = I_{d2}$ It is noted that the weakening currents $I_{d1}$ and $I_{d2}$ are calculated previously by using Eq. 3 from the motor constant and weakening factor.

$$I_{d1}=(\phi/L) \cdot (1-1/n_0)$$

$$I_{d2}=(\phi/L) \cdot (1-1/n_1) \qquad \text{(Eq. 3)}$$

where $n_0$ = weakening factor ($=\omega_2/\omega_1$)
$n_1$ = weakening factor ($=\omega_3/\omega_1$)
L = inductance of motor
$\phi$ = effective magnetic flux of motor For making a decision as to whether the torque command current $I^*_{q0}$ determined from the speed deviation is smaller or larger than the torque currents $I_{q1}$, $I_{q2}$, and $I_{q3}$ needed to produce a torque that is generated at the present speed, it is preferable to provide a hysteresis to the currents $I_{q1}$, $I_{q2}$, and $I_{q3}$ so that the torque command current $I^*_q$ and the weakening current $I^*_d$ can be prevented from chattering. Further, it is also preferable that the width of the hysteresis can be set independently of the currents $I_{q1}$, $I_{q2}$, and $I_{q3}$.

In the above description, it has been assumed that the weakening current is flowing in two patterns. However, it is needless to say that even if the weakening current is further increased in value for smoother rotation of the motor, the above algorithm can be used to accomplish similar control.

Moreover, in the embodiment, when the weakening current $I^*_d$ and the torque command current $I^*_q$ are determined, the above three conditions are used. However, the following two conditions can be used: a first condition where no weakening current flows as shown in the above condition (1); and a second condition where a weakening current flows as shown in the above condition (2) when $I_{q2}$ is not considered therein.

The weakening current $I_d$ (as well as the torque current $I_q$) is determined by the above-described algorithm.

Nextly, since the maximum current value $I_{max}$ of the motor is restricted by the switching device, the upper limit of the torque current $I_q$ is restricted by the following equation at step #10. That is, since $$I_{max}^2 = I_d^2 + I_q^2 \qquad \text{(Eq. 4)}$$

the result is that $$I_q = \sqrt{(I_{max}^2 - I_d^2)} \qquad \text{(Eq. 5)}$$

Figure 2:
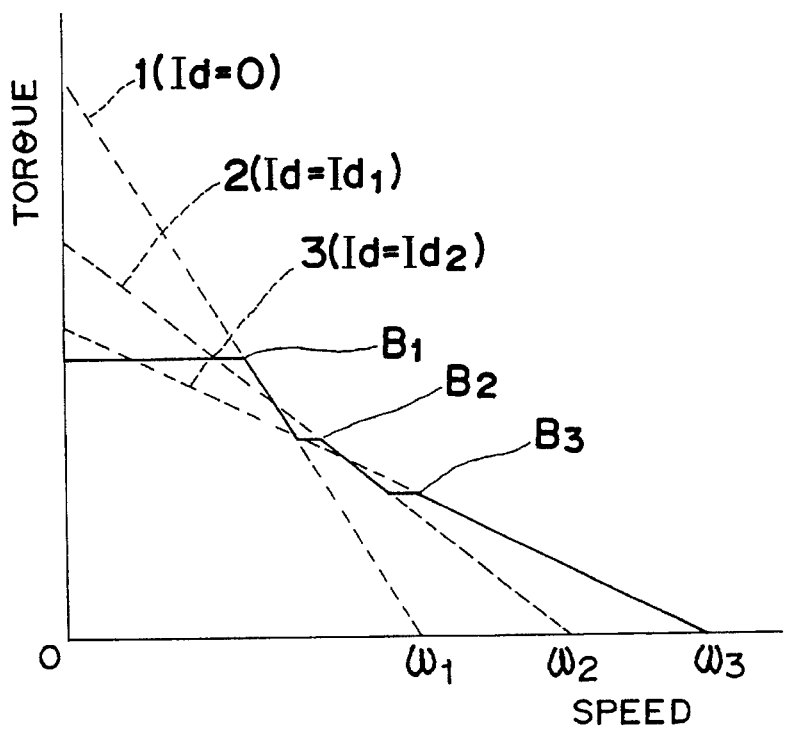
FIG. 2 is a speed-torque characteristic chart similarly showing the algorithm of the method for controlling a motor according to the first embodiment of the present invention.

Therefore, if the restriction of the torque current $I_q$ is added, the speed-torque characteristic of the motor results in a stepwise characteristic as shown in FIG. 2. In FIG. 2, a point $B_1$ is the position of a torque corresponding to that $I_{max}=I_q$, a point $B_2$ is the position of a torque corresponding to $I_q$ satisfying that $I_{max}^2 = I_{d1}^2 + I_q^2$, and a point $B_3$ is the position of a torque corresponding to $I_q$ satisfying that $I_{max}^2 = I_{d2}^2 + I_q^2$.

In this connection, it is apparent from FIG. 2 that the larger the number of patterns of weakening current, the smoother the rotation of the motor can be obtained.

According to the method for controlling a motor of the first embodiment, the weakening current can be determined by a simple method, and the motor can be controlled with a high efficiency.

Second Embodiment

A method for controlling a motor according to a second embodiment of the present invention is now described with reference to FIGS. 3, 4, and 11.

Figure 3:
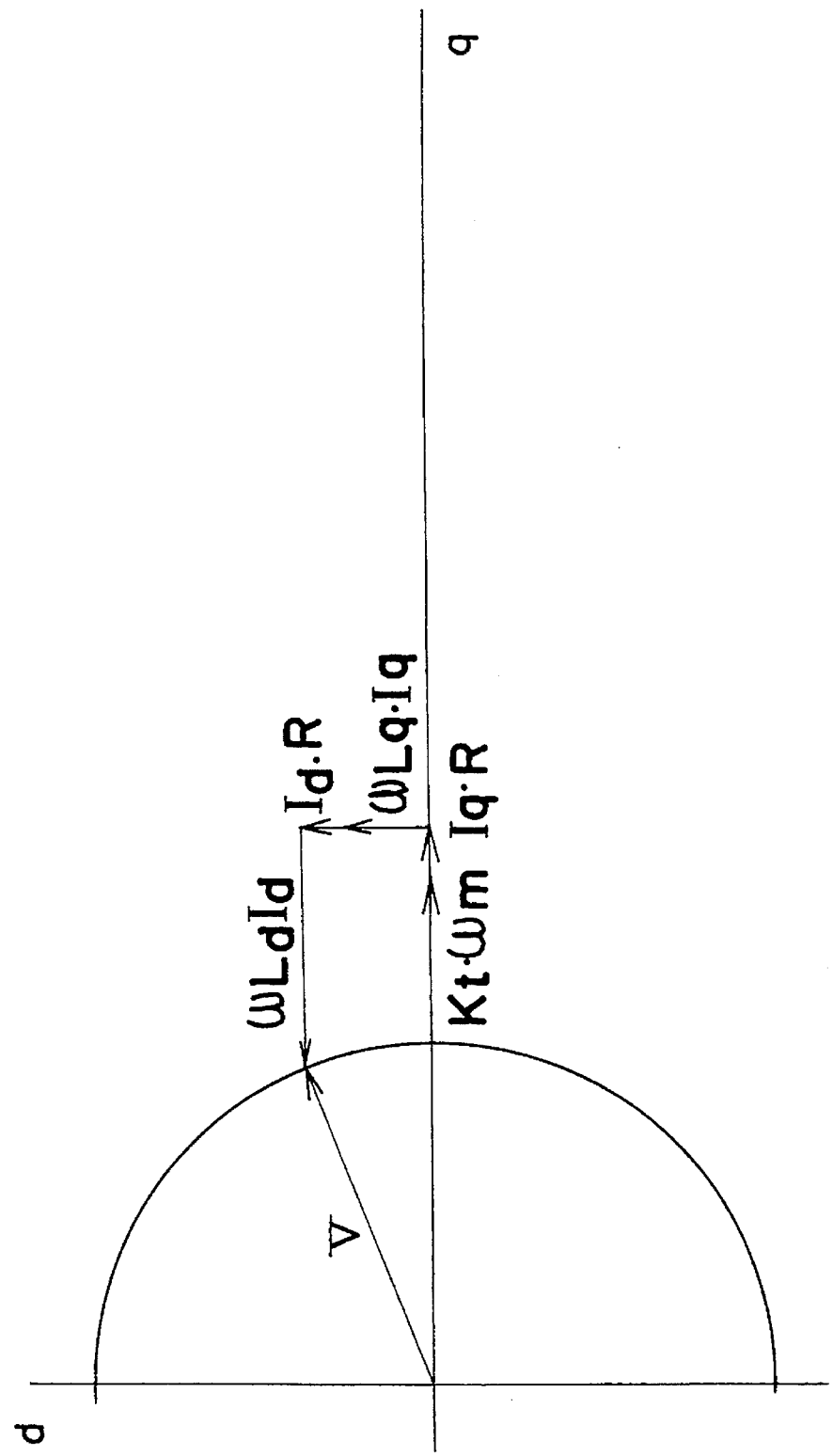
FIG. 3 is a voltage vector diagram of motor sections showing an algorithm of a method for controlling a motor according to a second embodiment of the present invention.

FIG. 3 is a vector diagram for explaining the algorithm for determining the weakening current (field-weakening current) of a synchronous motor by the method for controlling a motor according to the second embodiment of the present invention. The diagram shows vectors of voltages of each part of the motor when the torque current $I_q$ and the weakening current $I_d$ flow to drive the motor. FIG. 11 is the flowchart of the method. In FIG. 3, $K_t$ is the torque constant of the motor, $L_q$ is the torque (current axis which is hereinafter referred to as a q-axis) inductance of the motor, $L_d$ is the field-weakening (current axis which is hereinafter referred to as a d-axis) inductance of the motor, R is the resistance of the motor, P is the polar logarithm, $\omega_m$ is the present speed, and V is the applied voltage to the motor.

Further in FIG. 3, $(K_t \cdot \omega_m)$ is an induced voltage that the motor develops when the motor is rotating at the speed of $\omega_m$. $(I_q \cdot R)$ is a voltage that develops when the torque current $I_q$ has flowed through the resistance component of the motor. $(\omega L_q \cdot I_q)$ is a voltage that develops due to the q-axis inductance when the motor is rotating at the speed of $\mu_m$. $(I_d \cdot R)$ is a voltage that develops when the weakening current $I_d$ has flowed through the resistance component of the motor. $(\omega L_d \cdot L_d)$ is a voltage that develops due to the d-axis inductance when the motor is rotating at the speed of $\omega_m$.

In this case, the d-axis current is advanced in phase by 90° relative to the q-axis current.

Figure 24:
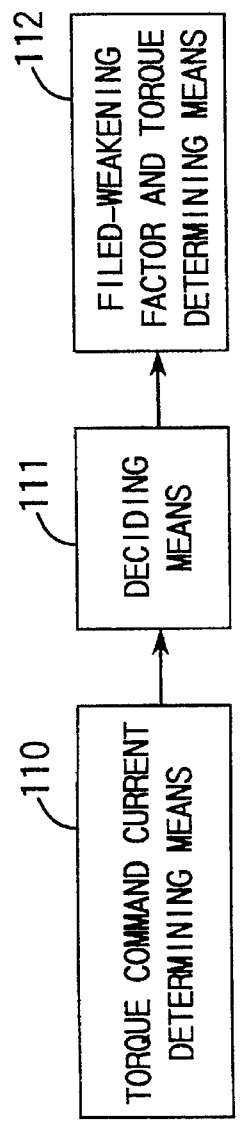
FIG. 24 is a view showing the construction of an apparatus for controlling a motor according to the second embodiment of the present invention.

An apparatus for controlling a motor according to the second embodiment of the present invention which can carry out the method is suitably used for an electromobile. As shown in FIG. 24, the apparatus includes a torque command current determining means 110 for carrying out steps #41 in FIG. 11, a deciding means 111 for carrying out steps #52 and #53, and a field-weakening factor and torque determining means 112 for carrying out steps #42–51.

Now the algorithm for determining the d-axis current is described.

(A) Now, for the motor to rotate with the torque current $I_q$, the weakening current $I_d$, and the rotational speed $\omega_m$, the sum of the vectors of the aforementioned developed voltages should be within a restrictive circle for an applied voltage V of the motor in FIG. 3.

Figure 11:
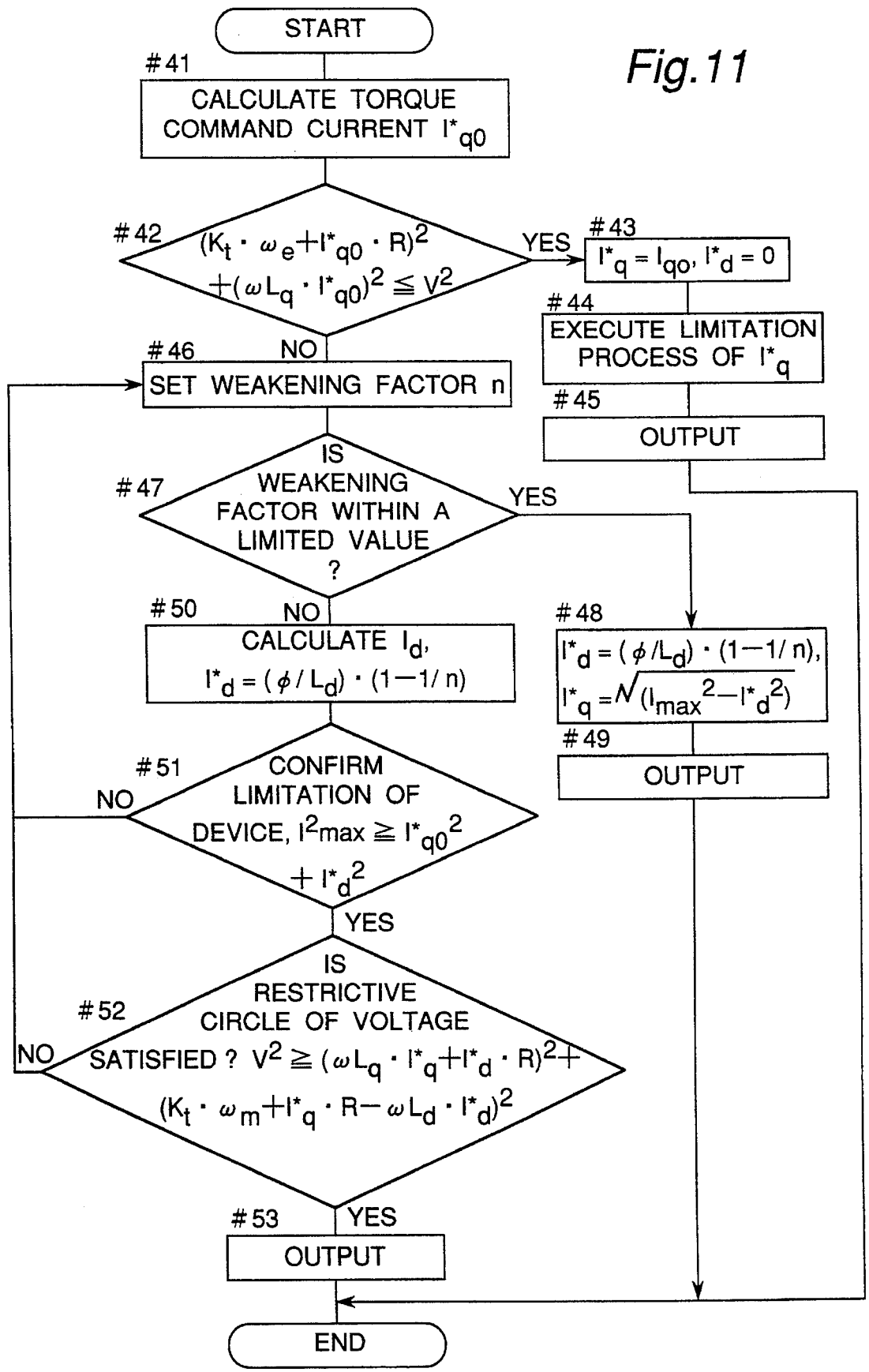
FIG. 11 is a flowchart of the method of the second embodiment.

(B) The torque command current $I^*_{q0}$ is calculated from the deviation between the command speed $\omega^*_e$ and the present speed $\omega_e$ at step #41 in FIG. 11.

(C) Based on the calculated torque command current $I^*_{q0}$, a determination is made as to whether or not the weakening current should be flowed. First, at step #42, if the following expression is satisfied $$(K_t \cdot \omega_e + I^*_{q0} \cdot R)^2 + (\omega L_q \cdot I^*_{q0})^2 \leq V^2 \quad \text{(Eq. 6)}$$

then the weakening current $I_d=0$ and the torque current $I_q = I^*_{q0}$ at step #43. At this time, the limitation process which is similar to that at step #10 in the first embodiment is carried out at step #44 and then the processed data is outputted at step #45. Also, if the following expression is satisfied $$(K_t \cdot \omega_e + I^*_{q0} \cdot R)^2 + (\omega L_q \cdot I^*_{q0})^2 > V^2 \quad \text{(Eq. 7)}$$

then the weakening current flows. That is, first, a weakening factor n is set at step #46 and then processes at step #47–#51 are carried out. That is, at step #47, a determination is made as to whether or not the weakening factor n is within a limited range. If yes, the process at step #48 is carried out and if no, the process at step #50 is carried out.

(D) The weakening current $I^*_d$ and the torque current $I^*_q$ are determined in the following way:

(D-1) First, at steps #48 and #50, the weakening current $I^*_d$ is determined by $$I^*_d = (\phi/L_d) \cdot (1 - 1/n) \quad \text{(Eq. 8)}$$

where $\phi$ is the effective magnetic flux ($=K_t/P$) of the motor and n is the weakening factor (n>1).

(D-2) Next, the torque current $I^*_q$ is determined in the following way. Although the motor current is determined by $$I^2 = I^{*2}_q + I^{*2}_d \quad \text{(Eq. 9)}$$

yet the motor current is limited to $I_{max}$ due to the upper limit of the switching device For this purpose, $I^2_{max} \geq I^{*2}_{q0} + I^{*2}_d$ should be satisfied at step #51 after the process at step #50 is carried out. If it is determined at step #51 that this equation is not satisfied, then the weakening factor n is re-set at step #46. Then, the torque current $I^*_{q0}$ is varied to satisfy the above equation, and then at step #48, the torque current $I^*_q$ to be outputted to the motor is determined by $$I^*_q = \sqrt{(I^2_{max} - I^{*2}_d)} \quad \text{(Eq. 10)}$$

When the process at step #48 is carried out, the torque current $I^*_q$ and the weakening current $I^*_d$ are outputted at step #49.

(D-3) Next, if it is determined at step #51 that this equation is satisfied, it is determined at step #52 whether or not the voltage V is within the restrictive circle for the voltage V (described in (A)), by Eq. 11:

$$V^2 \geq (\omega L_q \cdot I^*_q + I^*_d \cdot R)^2 + (K_t \cdot \omega_m + I^*_q \cdot R - \omega L_d \cdot I^*_d)^2 \quad \text{(Eq. 11)}$$

(D-4) If Eq. 11 is satisfied at step #52, the torque current $I^*_q$ and the weakening current $I^*_d$ are determined based on the weakening factor n and outputted at step #53, and when the conditions are not satisfied at step #52, the weakening factor n is gradually increased at step #46, so that a weakening factor n that satisfies all the conditions is determined and, based on the resultant weakening factor n, $I^*_q$ and $I^*_d$ are determined.

(D-5) Here are described several types of examples of the method of varying the weakening factor n.

(1) With n increased gradually from 1, a weakening current factor n that satisfies the condition of Eq. 11 of (D-3) is adopted.

Figure 5:
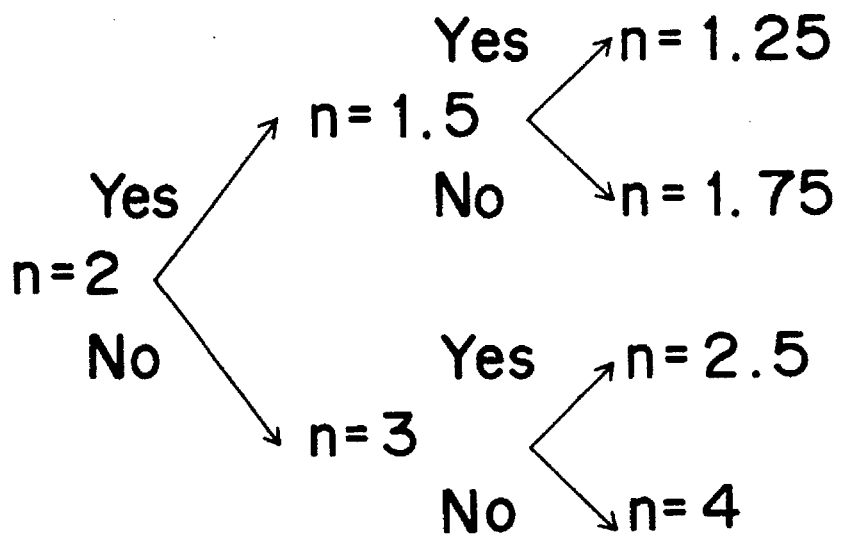
FIG. 5 is a schematic view showing the method of determining a weakening factor.

(2) The weakening current factor is determined by a sorting method as shown in FIG. 5.

(Example) Conditional decisions are made on the assumption that n=2, where the value of n is varied as shown in FIG. 5 according to the selection of Yes/No, whereby an optimum weakening factor n that satisfies the conditions is determined.

Figure 4:
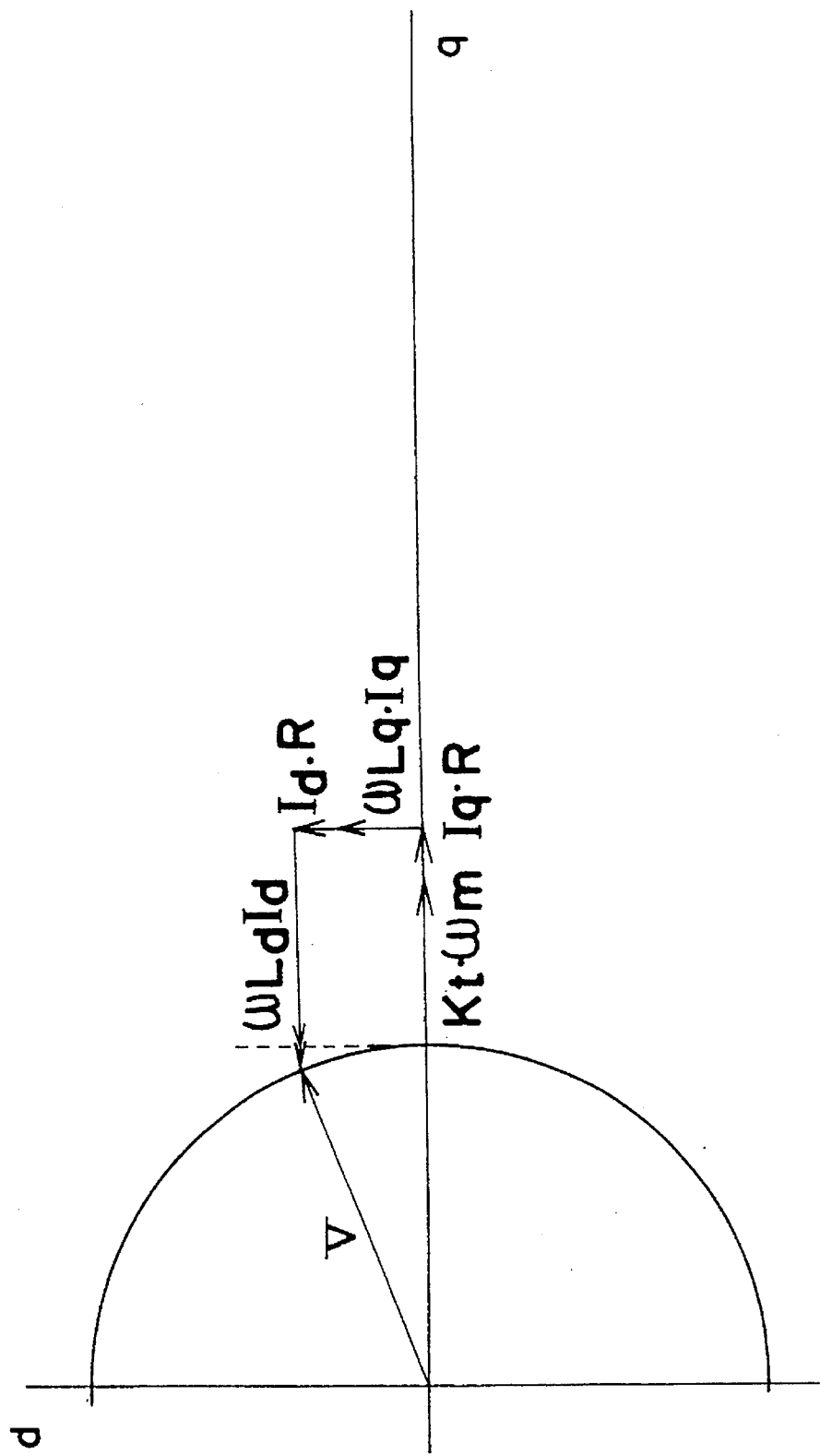
FIG. 4 is a voltage vector diagram of motor sections similarly showing the algorithm of the method for controlling a motor according to the second embodiment of the present invention.

(3) An approximate solution is determined and thereafter n is varied on (see FIG. 4). The following approximate equation $$L_d \cdot I_d = K_t \cdot \omega_m + I_q R - V \quad \text{(Eq. 13)}$$

corresponds to $(\omega L_d \cdot I_d)$ in FIG. 4. Based on this approximate equation, the weakening current $I_d$ is determined and further the weakening factor n is determined. The weakening current $I_d$ can be determined by Eq. 14:

$$I_d = (K_t \cdot \omega_m + I_q R - V)/\omega \cdot L_d \quad \text{(Eq. 14)}$$

Also, the weakening factor n can be determined by Eq. 15 that can be obtained by modifying Eq. 8.

$$n = \phi/(\phi - L_d I_d) \quad \text{(Eq. 15)}$$

Then, from the weakening factor n determined from the approximate equation, the weakening factor is increased gradually, whereby an n that satisfies the condition of Eq. 12 of (D-4) is adopted.

(E) The restrictive circle for voltage V has been assumed to be constant in the above description. However, when a battery is used as the power source, the applied voltage V to the motor varies with the level of the motor current due to the internal resistance of the battery. As a result, the restrictive circle for voltage V moves, in which case the resultant voltage V is defined by Eq. 16.

$$V = V_{Batt} - (I^*_q \cdot R_B)/\eta - V_{drop} \quad \text{(Eq. 16)}$$

where $V_{Batt}$ is the battery voltage, $R_B$ is the internal resistance of the battery, $V_{drop}$ is the voltage drop due to the switching device, and $\eta$ is the efficiency.

According to the method for controlling a motor of the second embodiment, since the maximum torque can be generated by a less (optimum) weakening current, it becomes possible to achieve the maximum efficiency control.

Third Embodiment

A third embodiment of the present invention is described with reference to FIGS. 6 to 8.

The third embodiment, which shows a method (algorithm) for limiting the motor current in order to reduce the output of the motor because of abnormalities such as heat generation, is described in detail below.

Described below is a case where no weakening current flows.

Figure 6:
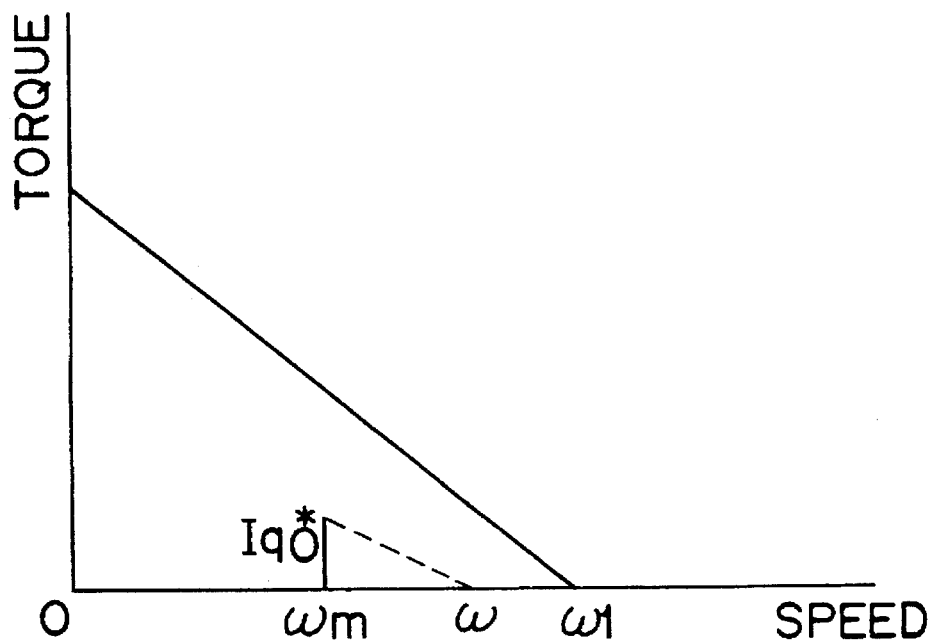
FIG. 6 is a speed-torque characteristic chart showing the algorithm of the method for controlling a motor according to a third embodiment of the present invention.

FIG. 6 shows a speed-torque characteristic with no weakening current flowing. With reference to this drawing, the algorithm for limiting the motor current is explained.

(1) A command to reduce the output is inputted.

(2) A torque command current $I^*_{q0}$ is calculated from the deviation between the speed command $\omega^*$ and the present speed $\omega$. This calculation method is the same with the first embodiment.

(3) The value of the calculated torque command current $I^*_{q0}$ is gradually decreased ($\rightarrow I^*_{q0}{}'$).

(4) The loss of the motor in t seconds is calculated according to Eq. 17.

$$L_S = \int_0^t I^2 \cdot R \, dt \quad \text{(Eq. 17)}$$

where the current I is expressed by Eq. 18:

$$I = \sqrt{I_q^2 + I_d^2} \quad \text{(Eq. 18)}$$

(5) For every t seconds, it is determined whether or not the loss value $L_S$ exceeds the abnormal loss $L_{SER}$, that is, the decision by Eq. 19 is executed.

$$L_S > L_{SER} \quad \text{(Eq. 19)}$$

(6) If any abnormality is involved, $I_q$ and $I_d$ need to be decreased for the purpose of reducing the loss. The method of decreasing them is described below.

It is noted that, to determine to what extent the loss is suppressed, the following is taken as the reference value, for example, to reduce the loss to 50%:

$$X_{CMP} = \frac{1}{2} \int_0^t I^2 \cdot R \, dt \quad \text{(Eq. 20)}$$

(7) When the weakening current is 0

(7-1) The torque current $I^*_{q01}$ determined from the deviation is corrected as $$I^*_{q1} = k_1 \cdot I^*_{q01}, \quad 0 < k_1 < 1 \quad \text{(Eq. 21)}$$

and outputted, where for example $k_1 = 0.95$.

Besides, the maximum current value $I_{max}$ to which the device is restricted is also corrected by Eq. 22.

$$I_{max1} = I_{max} \cdot k_1 \quad \text{(Eq. 22)}$$

(7-2) The current loss to be outputted is determined.

(7-3) For every certain time period, the integral value of (7-2) $X_{add}$ and the aforementioned $X_{CMP}$ are compared with each other. The condition that should hold is $$X_{CMP} > X_{add} \quad \text{(Eq. 23)}$$

(7-4) If the condition does not hold, a torque command current $I^*_{q02}$ determined from the deviation at the next sampling time is corrected according to the following equation:

$$I^*_{q2} = k_2 \cdot I^*_{q02} \quad \text{(Eq. 24)}$$

where $k_2 = k_1 \times k_1$, $$I_{max2} = I_{max} \cdot k_2 \quad \text{(Eq. 25)}$$

That is, $$I_{qn} = k_n \cdot I_{q0n} \quad \text{(Eq. 26)}$$

where $k_n = k_1^n$.

(7-5) If the condition of (7-3) is satisfied for $k_n$, the torque current determined from the deviation as well as the maximum current value are corrected by using the then resulting gain $k_n$.

$$I^*_{qn} = k_n \cdot I_{q0n} \quad \text{(Eq. 27)}$$

$$F_{XMAX} = k_n \cdot F_{XMAX} \quad \text{(Eq. 28)}$$

Then the gain $k_n$, if it satisfies the condition, is fixed for t seconds and outputted.

(7-6) Described below is the process of restoration.

Whereas the torque current determined from the deviation as well as the maximum current value have been corrected by the gain $k_n$, the torque current and the maximum current value are corrected conversely by the gain of $k_{n+1}$, i.e., $k_1^{(n-1)}$ to obtain the loss, as below:

$$I^*_{q(n+1)} = k_{n+1} \cdot I^*_{q0(n+1)} \quad \text{(Eq. 29)}$$

$$F_{XMAX(n+1)} = F_{XMAX} \cdot K_{n+1} \quad \text{(Eq. 30)}$$

$$k_n = k_1^n \quad \text{(Eq. 31)}$$

$$k_{n+1} = k_n/k_1 = k_1^{(n-1)} \quad \text{(Eq. 32)}$$

(7-7) In the same way as in the foregoing, the integral loss value $X_{add}$ and $X_{CMP}$ are compared with each other for every certain time period (see Eq. 23).

If the condition holds, the torque current $I_{q0(n+2)}$ determined from the deviation at the next sampling time is corrected as follows.

$$I^*_{q(n+2)} = k_{n+2} \cdot I^*_{q0(n+2)} \quad \text{(Eq. 33)}$$

$$F_{XMAX(n+2)} = F_{XMAX} \cdot k_{n+2} \quad \text{(Eq. 34)}$$

$$k_{n+1} = k_{n+1}/k_1 = k_1^{(n-2)} \quad \text{(Eq. 35)}$$

(7-8) Then, at a time point when the equation, $k_{n+n}=1$, has finally come to hold, a torque current determined from the normal speed deviation is outputted. That is, the torque current $I_{q0n}$ determined from the deviation is corrected with a gain k and besides the maximum current value is corrected at the same time.

$$k_n = k_1 \times k_{n-1} \quad \text{(Eq. 36)}$$

(where $k_0=1$, $0<k_1<1$, for example, $k_1=0.95$)

$$F_{XMAXn} = F_{XMAX} \cdot k_n \quad \text{(Eq. 37)}$$

This gain k is decreased, as shown above, for every one sample. The gain k is decreased until a target is attained by comparing the loss value with a target value for every certain time period T.

When the target has been attained, the gain of $k_n$ is used to do correction for T seconds. For restoration, its reverse process is taken, in which case the gain k is increased until k=1 finally. Thereafter, the motor is controlled with the torque current $I_q$ and the maximum current value $F_{XMAX}$ from the normal deviation.

(8) When weakening current>0

The method of decreasing the torque current is the same with the case where weakening current=0, and the method of decreasing the weakening current is as described above.

Figure 7:
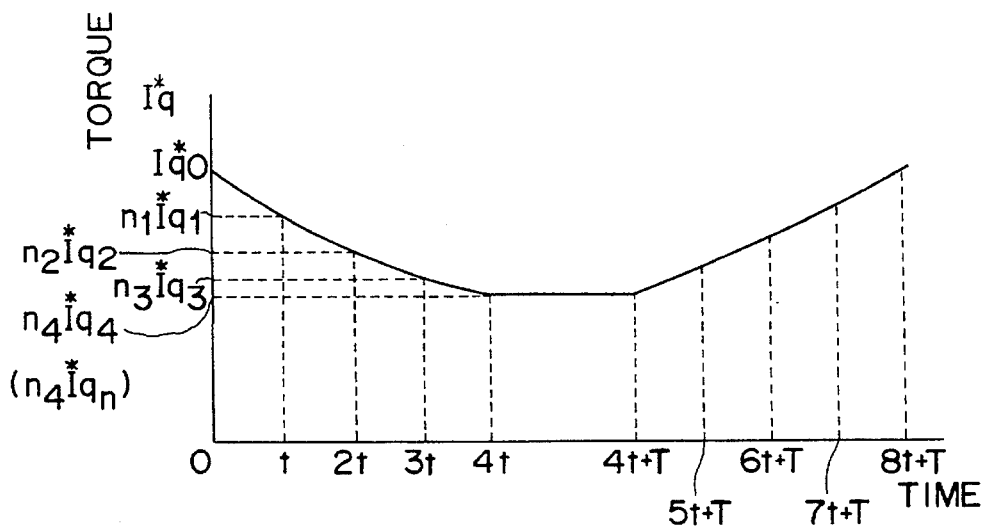
FIG. 7 is a torque current-time characteristic chart similarly showing the algorithm of the method for controlling a motor according to the third embodiment of the present invention.

Variation with time in the torque current $I^*_q$ in this case is shown in FIG. 7. In FIG. 7, it is shown that whereas the torque current $I^*_q$ is $I^*_{q0}$ at time 0, it decreases as $n_1 I^*_{q1}$, $n_2 I^*_{q2}$, $n_3 I^*_{q3}$, and $n_4 I^*_{q4}(I^*_{q4'})$ at time t, 2t, 3t, and 4t, respectively, and that decision is made at each time t, 2t, 3t, and 4t, in which the condition holds at time 4t seconds and thereafter the torque current $n_4 I^*_{qn}$ continues flowing for T seconds, whereafter the torque current $I^*_q$ gradually increases for every t seconds. It is noted that $n_1$ to $n_4$ are values smaller than 1.

Explained below is the algorithm in the case where the weakening current is flowing, with reference to FIG. 8.

(2-1)

(1) The torque current $I^*_{q0}$ determined from the speed deviation is calculated by using the correction gain k in the same way as in the foregoing case where $I_d=0$. At the same time the maximum current value is also corrected.

$$I^*_q = I^*_{q0} \times k_1 \qquad F_{XMAX}' = k_1 \cdot F_{XMAX}$$

(2) By using the corrected torque current $I^*_q$, $I_d$ is determined by the algorithm explained in the first embodiment.

(3) By using the calculated $I_d$, the torque current $I^*_q$ is corrected once again. In this process, the maximum current value to which the device is restricted is assumed to be $F_{XMAX1}$.

(2-2) A decision is made for every decision time period, t seconds. The decision is as described before.

(2-3) If the decision of (2-2) comes to no good, the output current is determined in a way that the torque current is calculated by using the correction gain k and $I_d$ is determined by using the corrected torque current.

Figure 8:
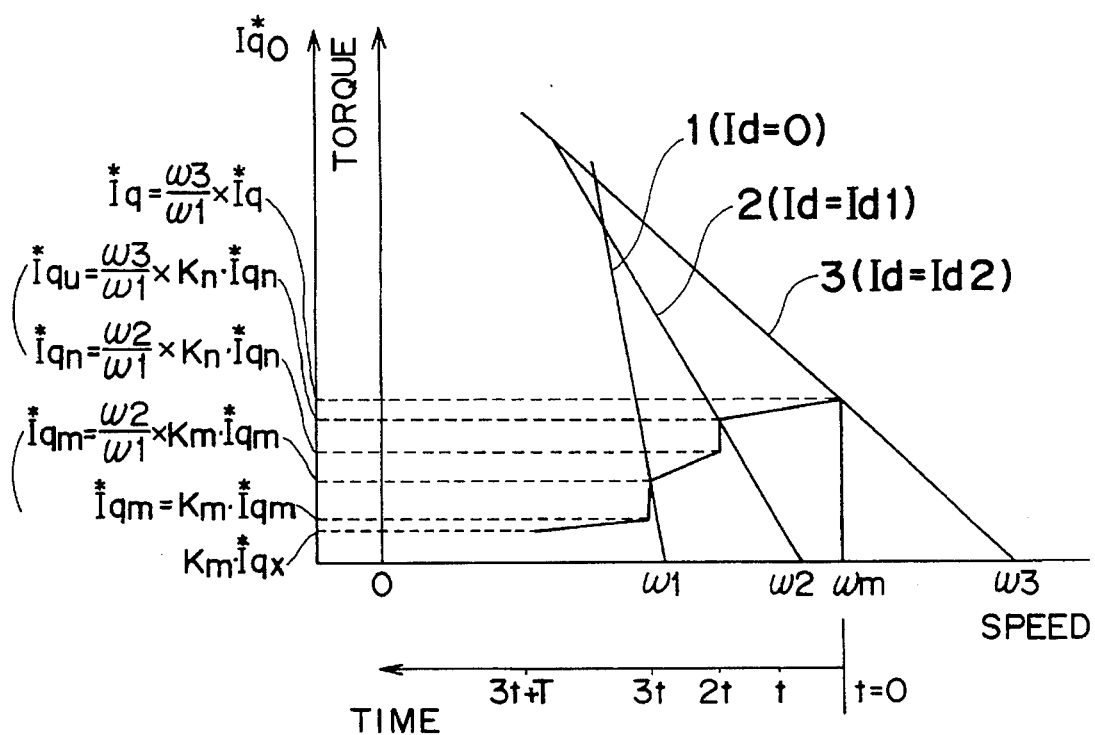
FIG. 8 is a torque-speed and time characteristic chart similarly showing the algorithm of the method for controlling a motor according to the third embodiment of the present invention.

It is noted that when the motor speed has decreased because of the reduced torque current and, as a result, the weakening current has moved, for example, from $I_{d2}$ to $I_{d1}$, it can be understood from FIG. 8 that the torque current has been corrected in proportion to the difference in weakening factor.

(2-4) If the condition of (2-2) holds, the algorithm, in which the torque current is calculated by using the correction gain k finally calculated and then the weakening current is calculated by using the resultant torque current, is executed for T seconds.

(2-5) Subsequently, the aforementioned algorithm is reversed, where the torque current determined from the normal speed deviation and the weakening current determined from the resultant torque current and the present speed are outputted.

The above-described algorithm is shown in FIG. 8. In FIG. 8, the stepwise solid line represents variation in the torque current.

In this embodiment, the description has been such that it is after the time 3t that the condition of (2-2) is satisfied. However, needless to say, even when the condition holds at time t or 2t, $I_q$ and $I_d$ are determined by using the finally calculated correction gain k and outputted for T seconds, and thereafter the algorithm is returned back in reverse.

Also, although the above description has been made in a case where the weakening current is in two patterns, yet the same processing may be applied to any increased number of patterns of weakening current.

According to this third embodiment, while the torque current is gradually decreased, a weakening current is outputted from corrected torque current and speed, whereby the motor output can be gradually decreased.

Fourth Embodiment

A fourth embodiment of the present invention is now described with reference to FIG. 9.

This embodiment shows a method (algorithm) for preventing over-regeneration of the battery due to over-rotation of the motor. The algorithm is described below with reference to FIG. 9.

(1) If the present speed is $\omega_m$ and the no-load rotational speed with no weakening current flowing is $\omega_1$, then the weakening factor n is first calculated according to Eq. 38.

$$n = \omega_m/\omega_1, \quad 1<n \quad \text{(Eq. 38)}$$

Figure 9:
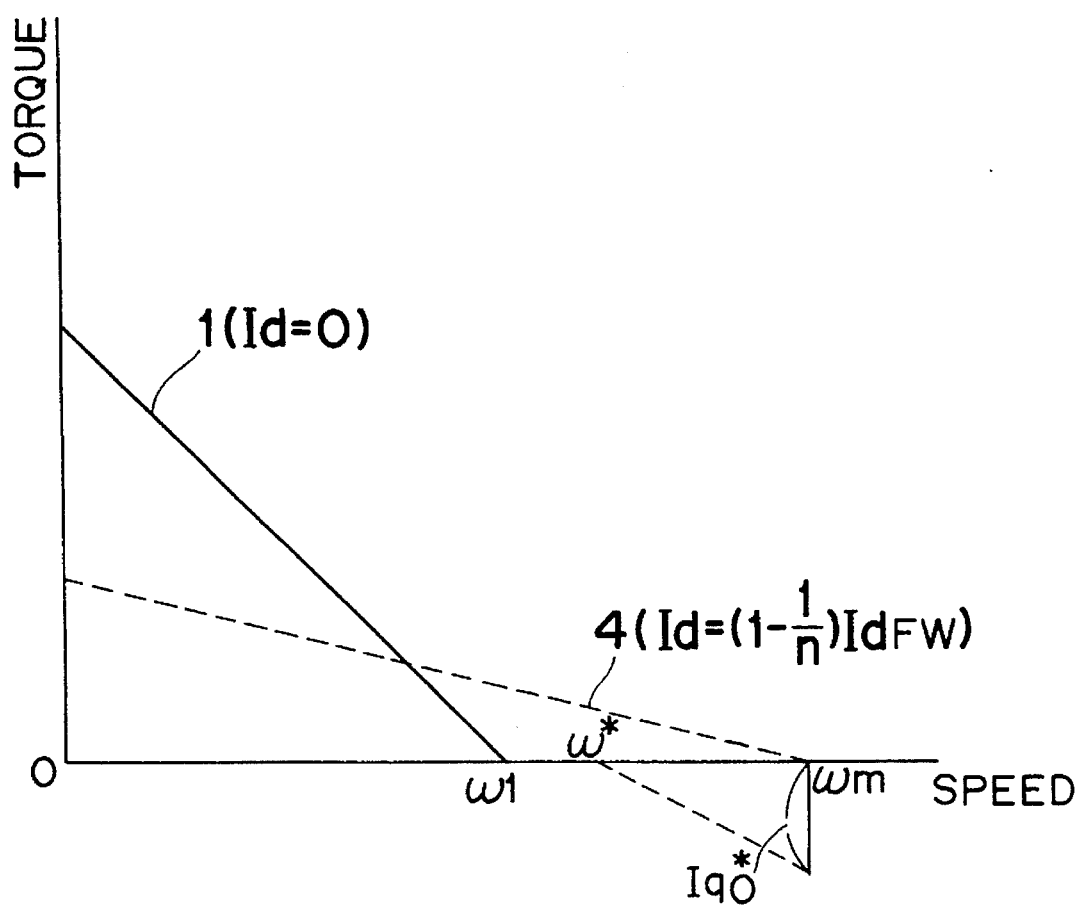
FIG. 9 is a torque-speed characteristic chart showing the algorithm of a method for controlling a motor according to a fourth embodiment of the present invention.

(2) Next, the weakening current $I_d$ is calculated according to Eq. 39 (see the characteristic curve 4 represented by broken line in FIG. 9).

$$I_d = (1-1/n)I_{dFW} \quad \text{(Eq. 39)}$$

where $I_{dFW}$ is the value of weakening current that can completely cancel the effective magnetic flux of the motor.

(3) A limit process for weakening current is executed.

The current value is restricted from the upper limit current $I_{max}$ of the switching device as shown by Eq. 40.

$$I_d \leq I_{max} \qquad \text{(Eq. 40)}$$

(4) The torque current $I_q$ is calculated.
(4-1) If $I_d = I_{max}$, then it is assumed that $I_q = 0$.
(4-2) If $I_d < I_{max}$,
(A) From the upper limit of the switching device, the maximum value $I_{qmax1}$ of the torque current $I_q$ is calculated according to Eq. 41.

$$I_{qmax1} = \sqrt{I_{max}^2 - I_d^2} \qquad \text{(Eq. 41)}$$

(B) Assuming that the maximum value of the charging current to the battery is $I_{Bmax}$ the maximum value $I_{qmax1}$ of the torque current $I_q$ and the maximum value $I_{Bmax}$ of the charging current are compared with each other, whereby the maximum value $I_{qmax}$ of the torque current is calculated. It is assumed that $I_{qmax} > 0$ and $I_{Bmax} > 0$.

If $I_{qmax1} \geq I_{Bmax}$, then $I_{qmax} = I_{Bmax}$.
If $I_{qmax} < I_{Bmax}$, then $I_{qmax} = I_{qmax1}$.

(C) The torque command current $I^*_{q0}$ determined from the speed deviation is calculated. If the torque command current $I^*_{q0}$ is corrected by the above-calculated weakening factor n, then the result will be $$I^*_q = n \times I^*_{q0} \qquad \text{(Eq. 42)}$$

(D) A limit process for torque current is executed.
If $|I^*_q| \leq I_{qmax}$, then the torque current is set to $I^*_q$.
If $|I^*_q| > I_{qmax}$, then the torque current is set to $-I_{qmax}$.
(4-3) With the output current calculated in (4-2), i.e., torque current $I^*_q$ or $-I_{qmax}$; and weakening current $I_d = (1-1/n) I_{dFW}$, the output continues to be fed until the state of over-regeneration is avoided. When it has been avoided, the output current is determined in the ordinary manner (see the first and second embodiments).

According to this fourth embodiment, it becomes possible to protect the battery from over-regeneration (overcharging). That is, the rotational speed of the motor can be reduced while the regeneration level is reduced (or the regeneration level is controlled).

According to the method for controlling a motor of the first embodiment, one type or a plurality of types of weakening current are previously set, a first torque command current determined from a speed deviation between a speed command to the motor and the present speed of the motor is compared with torque currents corresponding the torques, so that a second torque command current and a weakening current are determined and outputted depending on which range of the torque currents corresponding the torques the first torque command current falls upon. As a result, the second torque command current and the weakening current can be determined simply and efficiently.

According to the method for controlling a motor of the second embodiment, the weakening current and the torque current are determined while the weakening factor is varied as appropriate, on the conditions that the sum of voltage vectors of sections of the motor falls within a restrictive circle that depends on the applied voltage to the motor and that the torque current should be equal to a value resulting from multiplying the torque command current determined from the speed deviation with the weakening factor. As a result, the motor can produce the maximum torque with less weakening current, thus being capable of maximum efficiency control.

According to the method for controlling a motor of the third embodiment, when there is an input of a command for decreasing the motor output, the torque current and the weakening current are varied as appropriate, whereby the motor output can be decreased gradually.

According to the method for controlling a motor of the fourth embodiment, when the motor is put into an overrotation state, proper weakening current and torque current are calculated to control the motor, whereby any over-regeneration due to over-rotation can be prevented.

Fifth Embodiment

A motor controller according to a fifth embodiment of the present invention is described with reference to FIGS. 12 and 13.

Figure 12:
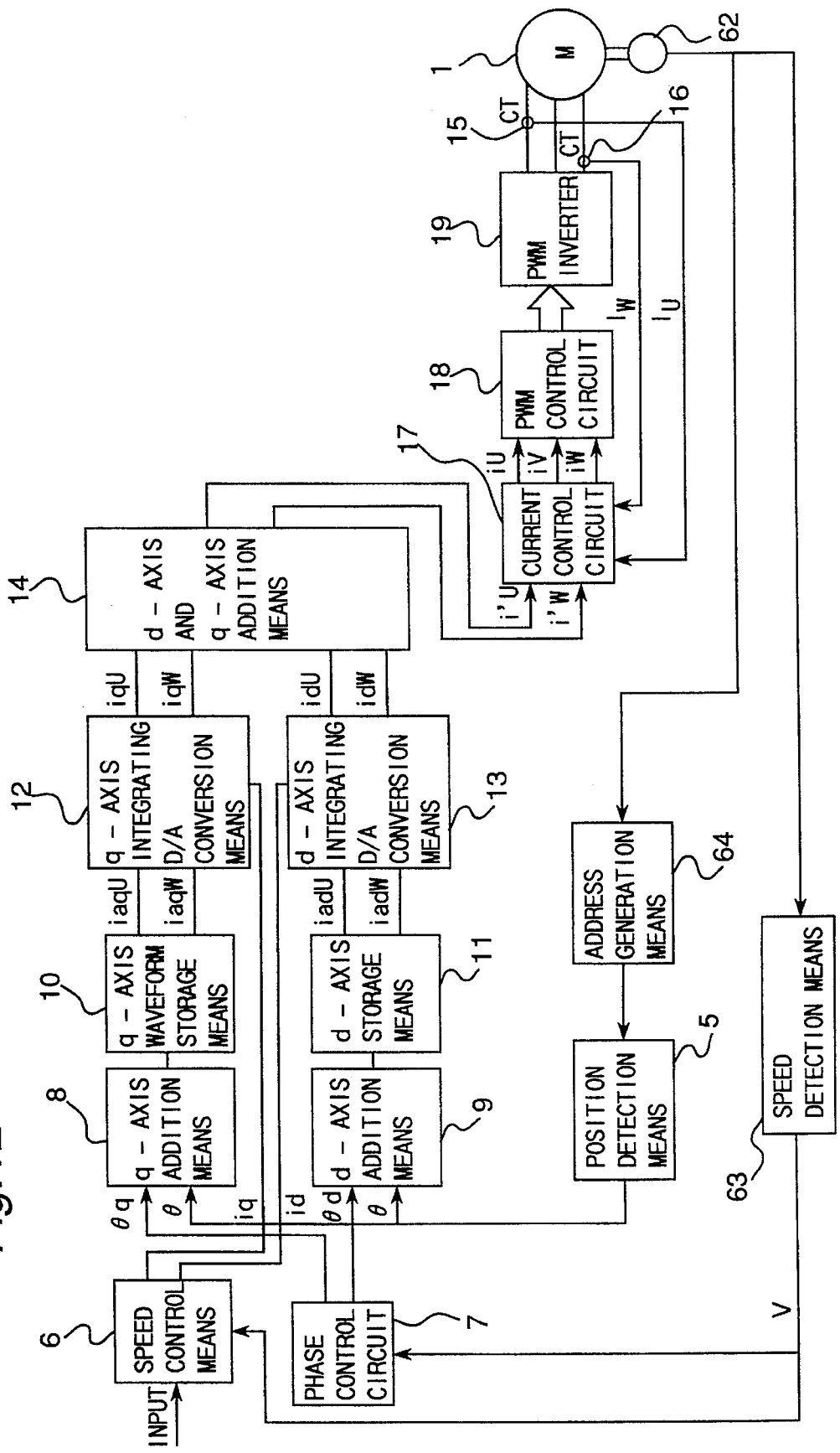
FIG. 12 is a block diagram showing the arrangement of a motor controller according to a fifth embodiment of the present invention.

FIG. 12 is a block diagram of the motor controller according to the fifth embodiment of the present invention. In FIG. 12, reference numeral 61 denotes a synchronous motor (hereinafter referred to simply as a motor), which is the drive source of an electromobile.

Reference numeral 62 denotes an encoder for rotation detection, which is connected directly to the motor 61.

Reference numeral 63 denotes a speed detection means for detecting the rotational speed of the motor 61 from an output signal of the encoder 62.

Reference numeral 64 denotes a position detection means for detecting the position of the rotor of the motor 61 from an output signal of the encoder 62.

Reference numeral 5 denotes an address generation means for generating a digital address signal θ corresponding to the position of the rotor of the motor 61 in response to the output of the position detection means 64.

Reference numeral 6 denotes a speed control means which outputs a q-axis speed control command signal $i_q$ and a d-axis speed control command signal $i_d$, which orthogonally cross each other, in correspondence with the difference between a speed command input, such as an acceleration signal and a brake signal, and an output signal v of the speed detection means 63.

Figure 13:
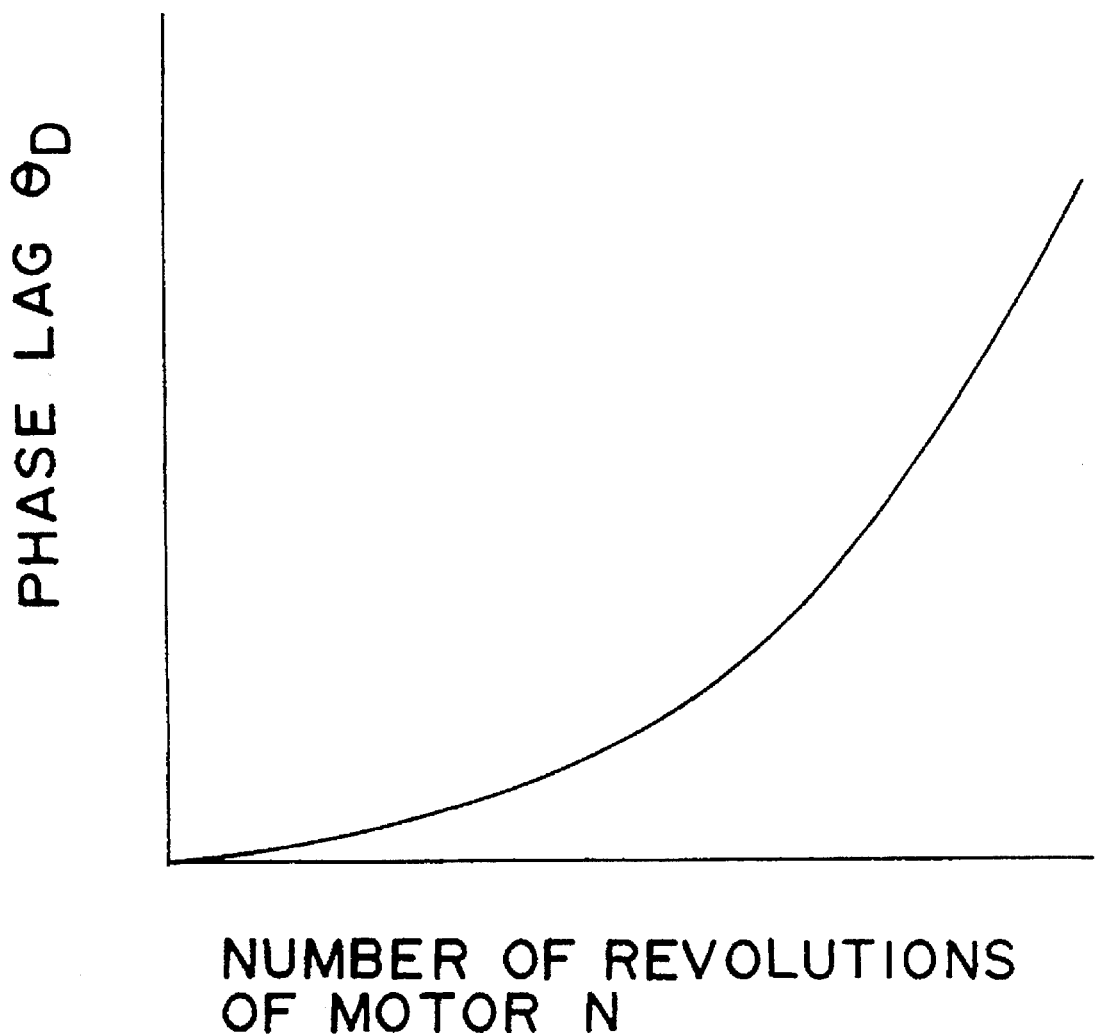
FIG. 13 is a characteristic chart showing the relationship between the number of revolutions, i.e.—rotational speed, and phase delay of a motor.

Reference numeral 7 denotes a phase control circuit 7 which stores phase correction data for correcting a change in phase lag (θD) of the q-axis current and the d-axis current due to a change in the rotational speed (number of revolutions N of the motor) of the motor 61 as shown in FIG. 13, and which receives an input of an output signal of the speed detection means 63 and yields outputs of q-axis and d-axis phase correction data $\theta_q$, $\theta_d$ corresponding to the rotational speed of the motor 61.

Reference numerals 8 and 9 denote a q-axis addition means and a d-axis addition means, respectively, for adding the q-axis phase correction data $\theta_q$ and d-axis phase correction data $\theta_d$ outputted from the phase control circuit 7 to the digital address signal θ outputted from the address generation means 5.

Reference numerals 10 and 11 denote a q-axis waveform storage means and a d-axis waveform storage means, respectively, which are each composed of a ROM that stores each one cycle of q-axis waveform data (fundamental wave data) and d-axis waveform data (fundamental wave data, shifted in phase 90° relative to the q-axis waveform data) for driving the motor 61, and which receive address inputs of corrected digital address signals $\theta+\theta_q$, $\theta+\theta_d$ outputted from the q-axis addition means 8 and the d-axis addition means 9, respectively, to read q-axis waveform data $i_{aqU}$ and $i_{aqW}$ of U-phase and W-phase as well as d-axis waveform data $i_{adU}$ and $i_{adW}$ of U-phase and W-phase for driving the motor 61, in correspondence with the rotor position of the motor 61.

Reference numerals 12 and 13 denote a q-axis integrating digital-to-analog (hereinafter, referred to as D/A) conversion means and a d-axis integrating D/A conversion means, respectively, which add up a q-axis speed control command signal $i_q$ and a d-axis speed control command signal $i_d$ outputted from the speed control means 6 to the q-axis waveform data $i_{aqU}$ and $i_{aqW}$ of U-phase and W-phase as well as d-axis waveform data $i_{adU}$ and $i_{adW}$ of U-phase and W-phase for driving the motor 61 outputted from the q-axis waveform storage means 10 and the d-axis waveform storage means 11, respectively, and moreover which perform D/A (digital-to-analog) conversion upon the addition results. The q-axis integrating D/A conversion means 12 and the d-axis integrating D/A conversion means 13 yield outputs of q-axis waveform signals $i_{qU}$ and $i_{qW}$ of U-phase and W-phase and d-axis waveform signals $i_{dU}$ and $i_{dW}$ of U-phase and W-phase.

Reference numeral 14 denotes a d-axis and q-axis addition means for adding and synthesizing output signals of the q-axis integrating D/A conversion means 12 and the d-axis integrating D/A conversion means 13 in U-phase and W-phase independently of each other. The d-axis and q-axis addition means 14 produces output signals $i'_U$ and $i'_W$.

Reference numerals 15 and 16 denote current detectors such as current transformers for detecting load currents of the U-phase and W-phase that flow through the motor 61.

Reference numeral 17 denotes a current control circuit which outputs current indication signals $i_U$, $i_V$, and $i_W$ of U-phase, V-phase, and W-phase based on error signals between the output signals $i'_U$ and $i'_W$ of the d-axis and q-axis addition means 14 and the detected signals $I_U$ and $I_W$ by the current detectors 15 and 16 for load currents flowing through the motor 61.

Reference numeral 18 denotes a PWM control circuit for generating pulse-width modulation (PWM) signals correspondingly to the current indication signals $i_U$, $i_V$, and $i_W$ of U-phase, V-phase, and W-phase outputted from the current control circuit 17.

Reference numeral 19 denotes a PWM inverter for driving the motor 61 according to the output signal of the PWM control circuit 18.

The operation of the motor controller having the above-described arrangement is described below.

The rotational speed of the motor 61 is detected by the speed detection means 63 from an output signal of the encoder 62 provided in the motor 61, while the rotor position of the motor 61 is detected by the position detection means 64. In response to an output of the position detection means 64, a digital address signal θ corresponding to the rotor position of the motor 61 is generated by the address generation means 5. Further, a q-axis speed control command signal $i_q$ and a d-axis speed control command signal $i_d$ crossing orthogonally to each other are outputted in correspondence with the difference between a speed command input from the speed control means 6 and an output signal v of the speed detection means 63.

When the output signal v of the speed detection means 63 is inputted, q-axis phase correction data $θ_q$ and d-axis phase correction data $θ_d$ corresponding to the rotational speed of the motor 61 are outputted from the phase control circuit 7. Then the q-axis and d-axis phase correction data $θ_q$ and $θ_d$ outputted from the phase control circuit 7 by the q-axis addition means 8 and the d-axis addition means 9 are added to the digital address signal θ outputted from the address generation means 5 and the addition results are fed to the q-axis waveform storage means 10 and the d-axis waveform storage means 11. Accordingly, readouts from the q-axis waveform storage means 10 and the d-axis waveform storage means 11 are waveform data that are in advanced phase by the extent of the q-axis and d-axis phase correction data $θ_q$ and $θ_d$ relative to the actual rotor position.

Also, when the correction data address signal $θ+θ_q$ and $θ+θ_d$ are fed from the q-axis addition means 8 and the d-axis addition means 9 to the q-axis waveform storage means 10 and the d-axis waveform storage means 11, the q-axis waveform data $i_{aqU}$ and $i_{aqW}$ and the d-axis waveform data $i_{adU}$ and $i_{adW}$ of U-phase and W-phase for driving the motor 61 are read out in correspondence with the rotor position of the motor 61.

Further, by the q-axis integrating D/A conversion means 12 and the d-axis integrating D/A conversion means 13, a q-axis speed control command signal $i_q$ and a d-axis speed control command signal $i_d$ outputted from the speed control means 6 are added to the q-axis waveform data $i_{aqU}$ and $i_{aqW}$ as well as d-axis waveform data $i_{adU}$ and $i_{adW}$ of U-phase and W-phase for driving the motor 61 outputted from the q-axis waveform storage means 10 and the d-axis waveform storage means 11, respectively, and moreover the addition results are subjected to D/A conversion. As a result, output signals $i_{qU}$, $i_{qW}$, $i_{dU}$, and $i_{dW}$ of U-phase and W-phase are generated from the q-axis integrating D/A conversion means 12 and the d-axis integrating D/A conversion means 13, where the output signals $i_{qU}$, $i_{qW}$, $i_{dU}$, and $i_{dW}$ of U-phase and W-phase of the q-axis integrating D/A conversion means 12 and the d-axis integrating D/A conversion means 13 are added up and synthesized by the d-axis and q-axis addition means 14. Thus, output signals $i'_U$ and $i'_W$ of U-phase and W-phase (indication values of U-phase and W-phase) are generated from the d-axis and q-axis addition means 14.

Then, error signals between the output signals $i'_U$ and $i'_W$ of U-phase and W-phase of the d-axis and q-axis addition means 14 and detection signals $I_U$ and $I_W$ of load currents actually flowing through the motor 61 are detected by the current control circuit 17. Based on the error signals, current indication signals $i_U$, $i_V$, and $i_W$ of U-phase, V-phase, and W-phase (actual current indication values for U-phase, V-phase, and W-phase) are outputted by the current control circuit 17. Then a pulse-width modulation signal is generated by the PWM control circuit 18 in response to the output signal of the current control circuit 17, which means that voltage conversion is performed. Thus, the motor 61 is driven by the PWM inverter 19 in response to the output signal of the PWM control circuit 18.

The operation described above allows the motor 61 to be driven into rotation and makes it possible to effect the field-weakening control on the motor 61. Also, phase shift of field-weakening current relative to the position of the rotor of the motor 61 is reduced, so that constant effect of the field-weakening can be obtained irrespective of the rotational speed of the motor 61.

In this connection, described below is the relationship between the output signal of the speed control means 6 and the fundamental waveform after D/A conversion. The speed control means 6 issues a voltage indication of, for example, 0 to 5 V dc, so that the amplitude of the fundamental waveform after D/A conversion varies. For example, when the voltage indication is 1 V, the amplitude of the fundamental waveform is 1 V; when the voltage indication is 2 V, the amplitude of the fundamental waveform is 2 V.

Sixth Embodiment

A sixth embodiment of the present invention is now described with reference to FIG. 14.

Figure 14:
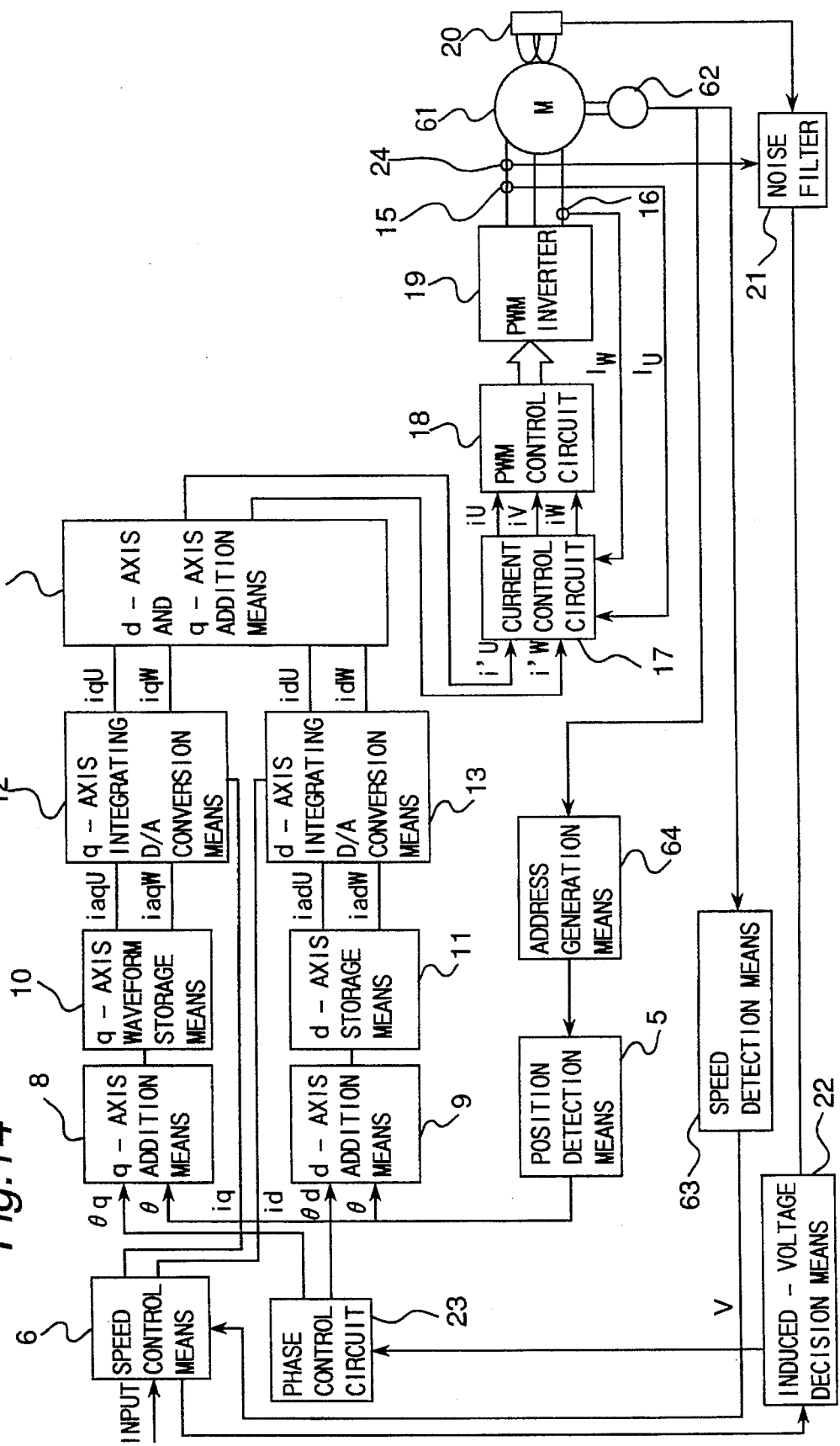
FIG. 14 is a block diagram showing the arrangement of a motor controller according to a sixth embodiment of the present invention.

FIG. 14 is a block diagram of a motor controller according to the sixth embodiment of the present invention. In FIG. 14, reference numeral 20 denotes an induced voltage detector for detecting an induced voltage of the motor 61, the induced voltage detector being built in the motor 61. Reference numeral 21 denotes a filter circuit for removing noise due to pulse-width modulation or the like from an output signal of the induced voltage detector 20. Reference numeral 22 denotes an induced-voltage decision means for comparing the induced voltage of the motor 61 detected by the induced voltage detector 20 with a target induced voltage and making a decision. Reference numeral 23 denotes a phase control circuit for outputting phase correction data corresponding to the output signal of the induced-voltage decision means 22. Then, by the q-axis addition means 8 and the d-axis addition means 9, q-axis and d-axis phase correction data $\theta_q$ and $\theta_d$ outputted from the phase control circuit 23 are added to the digital address signal $\theta$ outputted from the address generation means 5 and the addition result is fed to the q-axis waveform storage means 10 and the d-axis waveform storage means 11.

Reference numeral 24 denotes an induction coil for detecting induced voltage components generated by pulse-width modulation. The induced voltage components are removed from the induced voltage of the motor 61 by the filter circuit 21.

The arrangement other than the above is the same as in the fifth embodiment of FIG. 12.

Described below is the operation of this sixth embodiment. An induced voltage of the motor 61 is detected by the induced voltage detector 20. The induced voltage detected by the induced voltage detector 20 is compared with a target induced voltage by the induced-voltage decision means 22, so that phase correction data corresponding to an output signal of the induced-voltage decision means 22 is outputted from the phase control circuit 23. Then, q-axis and d-axis phase correction data $\theta_q$ and $\theta_d$ outputted from the phase control circuit 23 are added to a digital address signal $\theta$ outputted from the address generation means 5 by the q-axis addition means 8 and the d-axis addition means 9 and the addition results are fed to the q-axis waveform storage means 10 and the d-axis waveform storage means 11, whereby feedback control is effected so that the induced voltage of the motor 61 approximates the target induced voltage. As a result, the phase and level of the d-axis current vary so that the induced voltage of the motor 61 approximates the target induced voltage. The operation other than the foregoing is the same as in the fifth embodiment.

According to this motor controller, the state of the field weakening is detected as the level of an induced voltage of the motor 61. By feeding back the detected induced voltage level, the apparatus can accomplish more efficient field-weakening control.

Seventh Embodiment

A seventh embodiment of the present invention is described with reference to FIG. 12 and FIGS. 15 to 18.

This motor controller, although the same as in the fifth embodiment shown in FIG. 12 in terms of circuit blocks, differs in waveform data to be stored in the q-axis waveform storage means 10 and the d-axis waveform storage means 11. More specifically, whereas the fifth embodiment has been so arranged that fundamental wave (sine wave) data is to be stored, the present seventh embodiment differs from the above in that waveform data of approximately trapezoidal wave, which results from adding a specified harmonic component to the fundamental-wave component, is to be stored in the q-axis waveform storage means 10 and the d-axis waveform storage means 11 as the q-axis waveform data and d-axis waveform data for driving the motor 61.

The q-axis waveform data and d-axis waveform data to be stored in the q-axis waveform storage means 10 and the d-axis waveform storage means 11 are expressed by Eq. 43:

$$y = \sum_{n=1}^{k} A_n \sin(2n-1)\theta \qquad (0 \leq A_n \leq 2) \qquad \text{(Eq. 43)}$$

Figure 15:
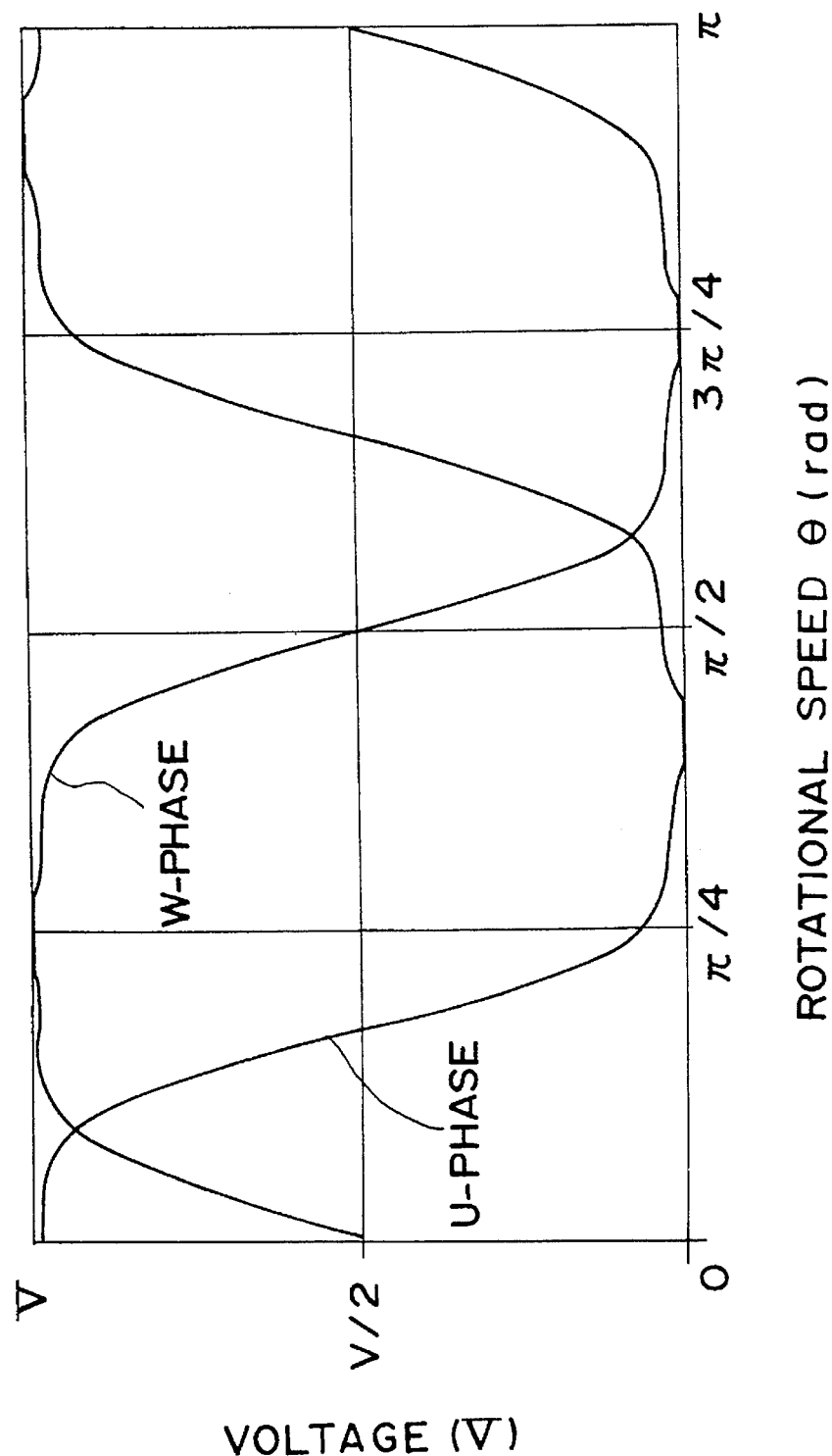
FIG. 15 is a waveform diagram of U phase and W phase terminal voltages applied to the motor in the motor controller according to a seventh embodiment of the present invention.
Figure 16:
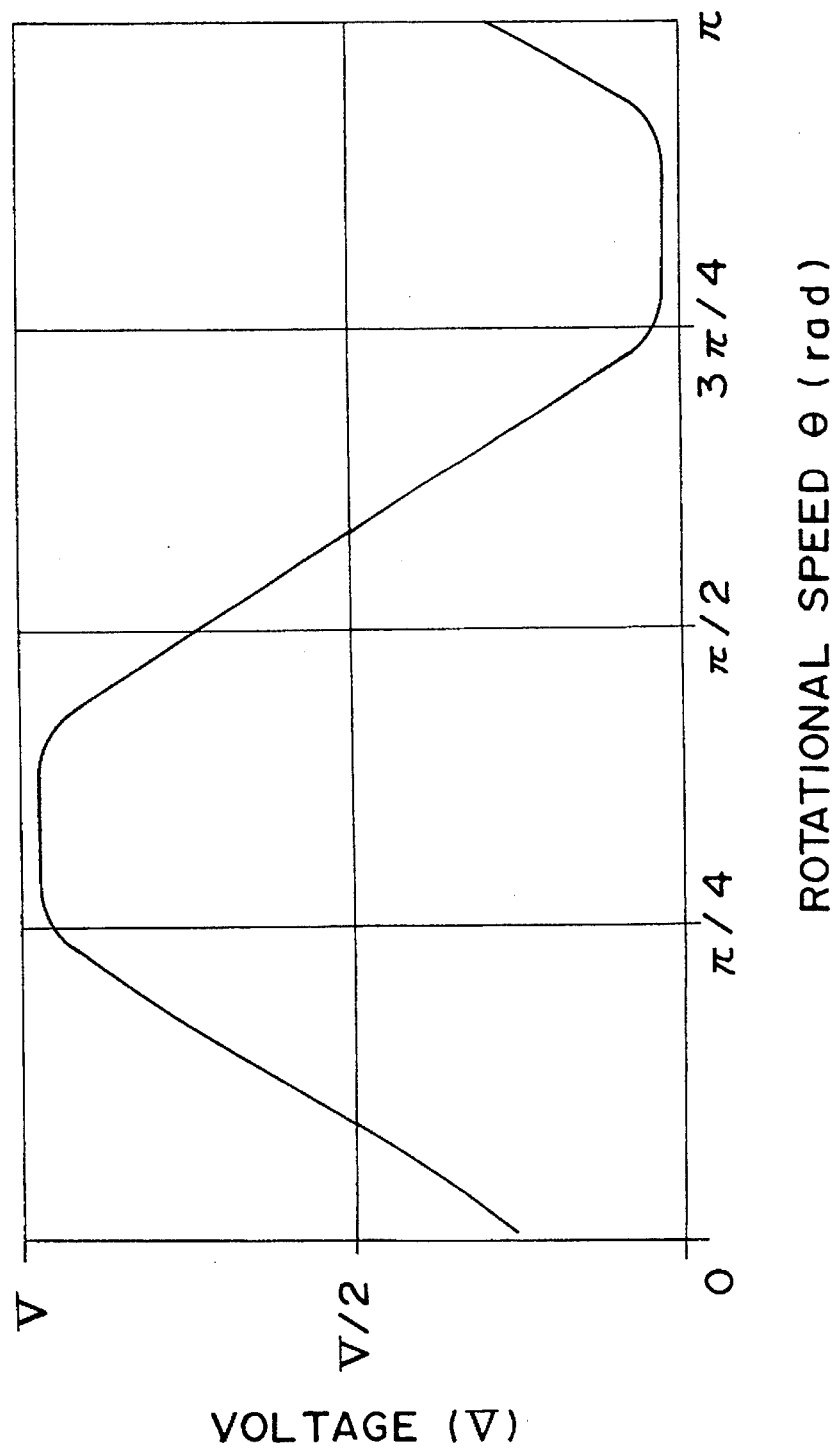
FIG. 16 is a waveform diagram of U–W phase terminal-to-terminal voltage applied to the motor also of the seventh embodiment.

In this case, the terminal-voltage waveforms of a U-phase terminal and a W-phase terminal of the motor 61 are as shown in FIG. 15. The then resulting U–W phase terminal-to-terminal voltage is as shown in FIG. 16. Thus, the voltage applied between power-supply input terminals of the motor 61 is applied to the motor 61 generally as is.

Figure 17:
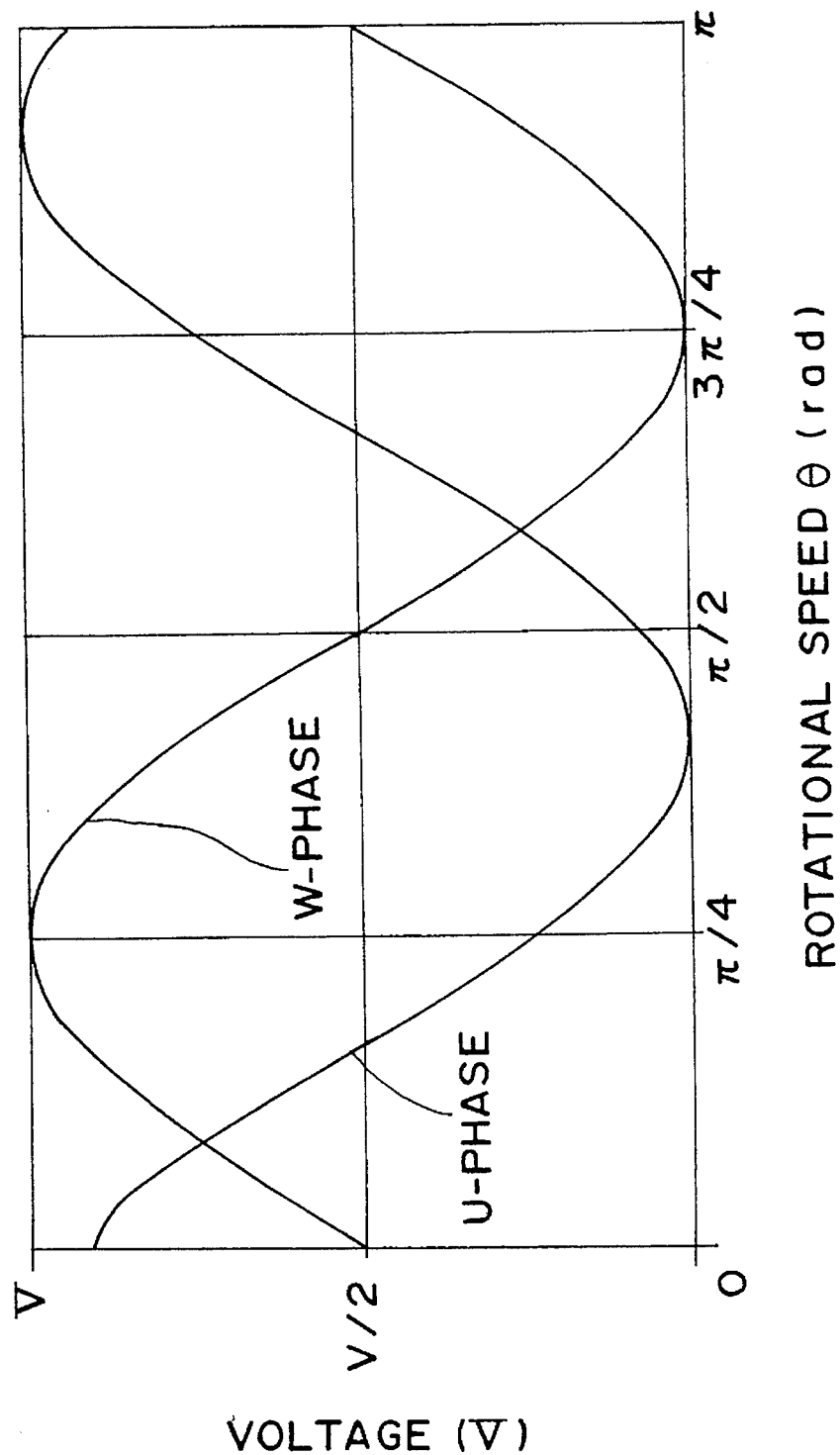
FIG. 17 is a waveform diagram showing terminal voltages of U phase and W phase applied to the motor in the motor controller according to the seventh embodiment of the present invention.
Figure 18:
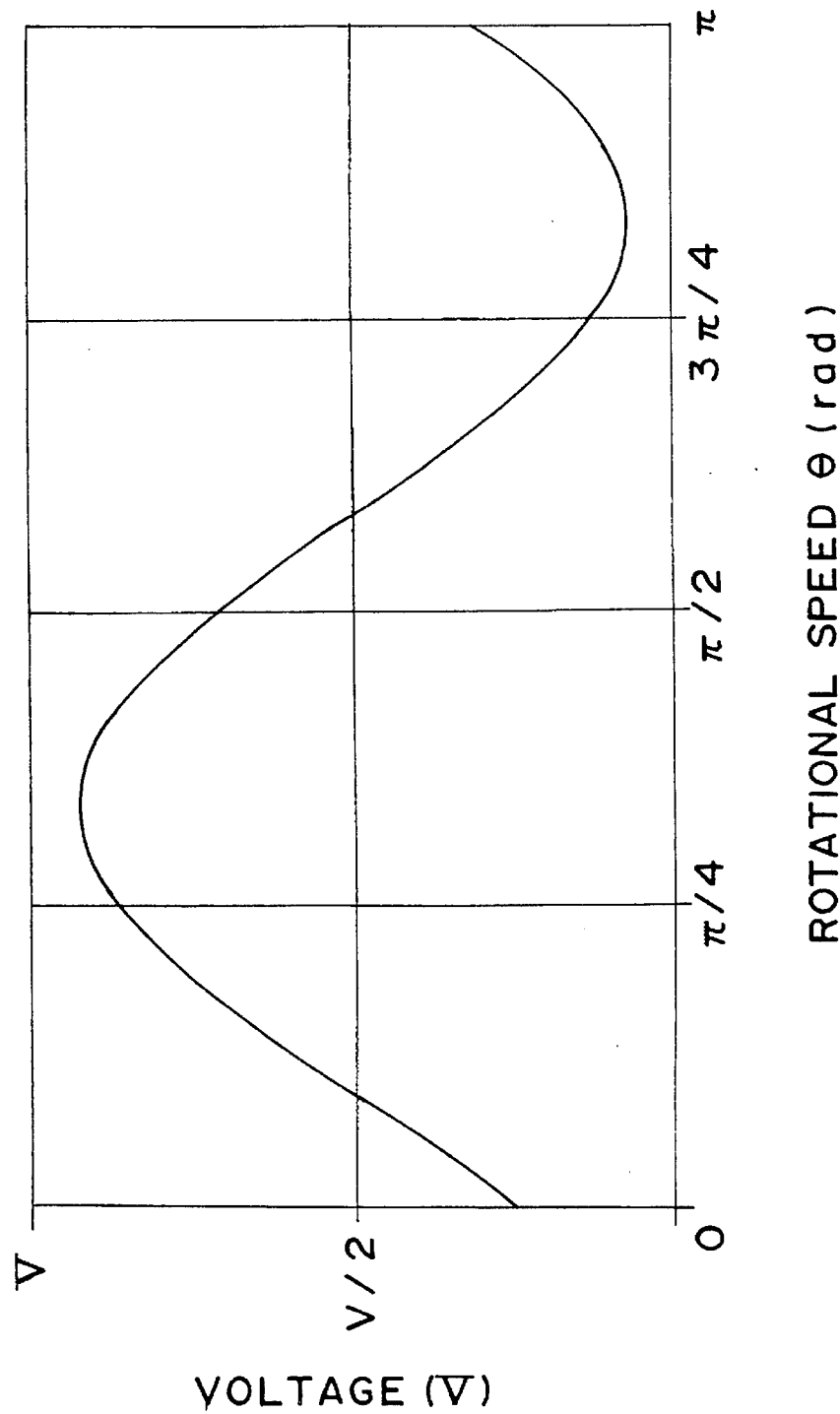
FIG. 18 is a waveform diagram of U–W phase terminal-to-terminal voltage applied to the motor also of the seventh embodiment.

Meanwhile, when the q-axis waveform data and the d-axis waveform data stored in the q-axis waveform storage means 10 and the d-axis waveform storage means 11 are fundamental-wave data as in the fifth embodiment, the terminal-voltage waveforms of the U-phase terminal and the W-phase terminal are as shown in FIG. 17. The then resulting U–W phase terminal-to-terminal voltage is as shown in FIG. 18.

Accordingly, compared with the case where a sine wave is used as in the fifth embodiment, approximately 1.27 times the amount of energy can be effectively fed to the motor 61 if the amplitude is the same. As a result, the q-axis shows enhanced torque efficiency, while the d-axis shows enhanced field-weakening efficiency.

Eighth Embodiment

In the above seventh embodiment, the arrangement has been such that, for both q-axis waveform data and d-axis waveform data, waveform data of approximately trapezoidal wave in which a specified harmonic component has been added to the fundamental-wave component is to be stored. However, as an eighth embodiment of the present invention, it may also be arranged that, for only either one of the q-axis waveform data or the d-axis waveform data, such waveform data of approximately trapezoidal wave in which a specified harmonic component has been added to the fundamental-wave component is stored, while for the other the fundamental-wave data is stored.

According to the fifth embodiment, the rotational speed of the motor is detected by a speed detection means from an output signal of the encoder provided in the motor and the rotor position of the motor is detected by the position detection means, and moreover a digital address signal corresponding to the rotor position of the motor is generated by the address generation means in response to an output of the position detection means. Further, a q-axis speed control command signal and a d-axis speed control command signal crossing orthogonally each other are outputted by a speed control means in correspondence with the difference between a speed command input and an output of the speed detection means. Furthermore, taking a digital address signal outputted from the address generation means as an address input, q-axis waveform data and d-axis waveform data for use of driving the motor are read from the q-axis waveform storage means and the d-axis waveform storage means that have stored each one cycle of q-axis waveform data and d-axis waveform data for driving the motor, respectively, in correspondence with the rotor position of the motor. Still more, by the q-axis integrating D/A conversion means and the d-axis integrating D/A conversion means, a q-axis speed control command signal and a d-axis speed control command signal outputted from the speed control means are added to the q-axis waveform data and the d-axis waveform data for driving the motor outputted from the q-axis waveform storage means and the d-axis waveform storage means, respectively, and the addition results are subjected to D/A conversion. Then output signals of the q-axis integrating D/A conversion means and the d-axis integrating D/A conversion means are added and synthesized by the d-axis and q-axis addition means. Further, error signals between output signals of the d-axis and q-axis addition means and detection signals of load currents flowing through the motor are outputted, and a pulse-width modulation signal is generated by the PWM control circuit in response to an output signal of the current control circuit. Thus, the motor is driven by the PWM inverter in response to the output signal of the PWM control circuit.

The operation of the apparatus allows the motor to be driven into rotation and besides makes it possible to effect the field-weakening control of the motor.

According to the sixth embodiment, phase correction data for correcting any change in phase lag due to a change in the rotational speed of the motor is stored by the phase control circuit, and a piece of phase correction data in correspondence with the rotational speed of the motor is outputted from the phase control circuit with an output signal of the speed detection means taken as an input. Then the phase correction data outputted from the phase control circuit is added to the digital address signal outputted from the address generation means by the q-axis addition means and the d-axis addition means and the addition results are fed to the q-axis waveform storage means and the d-axis waveform storage means. As a result, phase shift of the field-weakening current relative to the rotor position of the motor is reduced, so that constant field-weakening effect can be obtained irrespective of the rotational speed of the motor.

According to the seventh embodiment, an induced voltage of the motor detected by the induced voltage detector is compared and decided with a target induced voltage by the induced-voltage decision means, and a piece of phase correction data corresponding to an output signal of the induced-voltage decision means is outputted from the phase control circuit. Then the phase correction data outputted from the phase control circuit is added to the digital address signals outputted from the address generation means by the q-axis addition means and the d-axis addition means and the addition results are fed to the q-axis waveform storage means and the d-axis waveform storage means. Thus, such feedback is effected that the induced voltage of the motor approximates the target induced voltage, whereby more efficient field-weakening control can be accomplished.

According to the motor controller of the eighth embodiment, q-axis waveform data and d-axis waveform data for driving the motor are provided by waveform data of approximately a trapezoidal wave in which a specified harmonic component has been added to the fundamental-wave component. Therefore, the quantity of energy applied to the motor can be increased as compared with the case where a sine wave of the same amplitude is applied. As a result, torque efficiency can be enhanced for the q-axis waveform data, while field-weakening efficiency can be enhanced for the d-axis waveform data.

Ninth Embodiment

Figure 19:
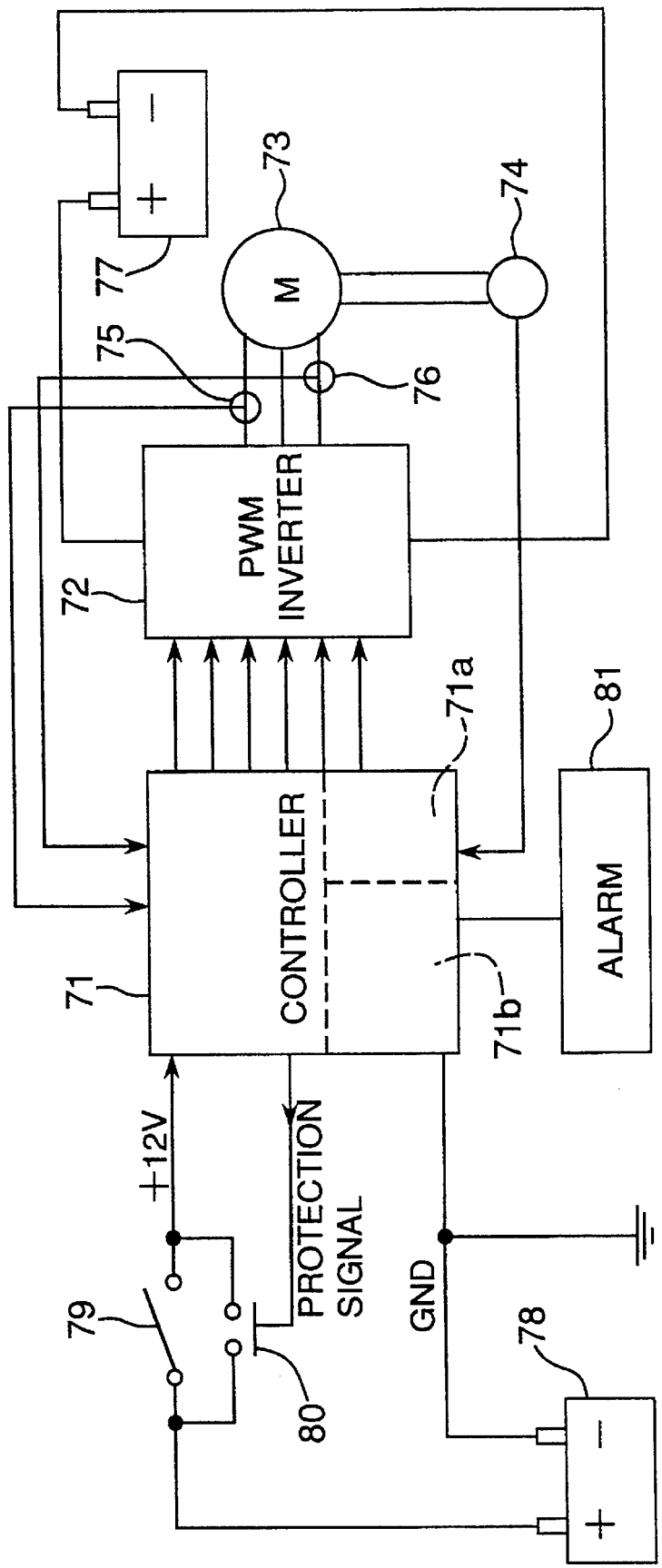
FIG. 19 is a block diagram showing the arrangement of an electromobile having a protection apparatus according to a ninth embodiment of the present invention.

FIG. 19 is a block diagram of an electromobile according to a ninth embodiment of the present invention. In FIG. 19, there are shown a controller 71, a PWM inverter 72, a motor 73 such as a synchronous motor, an encoder 74 coupled with a rotating shaft of the motor 73, current detectors 75, 76 for detecting phase currents of the motor 73, a primary battery 77 for feeding power to the motor 73 via the PWM inverter 72, and a control battery 78 for feeding control power to the controller 71 via a key switch 79.

In the electromobile having the above arrangement, when the operator turns on the key switch 79, the controller 71 is thrown into operation. The controller 71 is connected to the motor 73 via the PWM inverter 72, and commutates the motor 73 at a proper timing. In this case, the controller 71 controls the PWM inverter 72 in such a way that a torque current and a field-weakening current shifted in phase 90° with respect to the torque current flow through the motor 73. The motor 73 rotates with power fed from the primary battery 77 of a voltage $V_{Batt}$ thereto via the PWM inverter 72. Also, from the encoder 74 coupled with the rotating shaft of the motor 73, positional information of the rotor of the motor 73 and the speed of the motor 73 are turned back to the controller 71 and moreover a phase current of the motor 73 is detected by means of the current detectors 75 and 76 or the like and turned back to the controller 71. Based on these feedback signal, acceleration signal, accelerator switch signal, brake signal, and the like, the rotation of the motor 73 is properly controlled by the controller 71.

Figure 20:
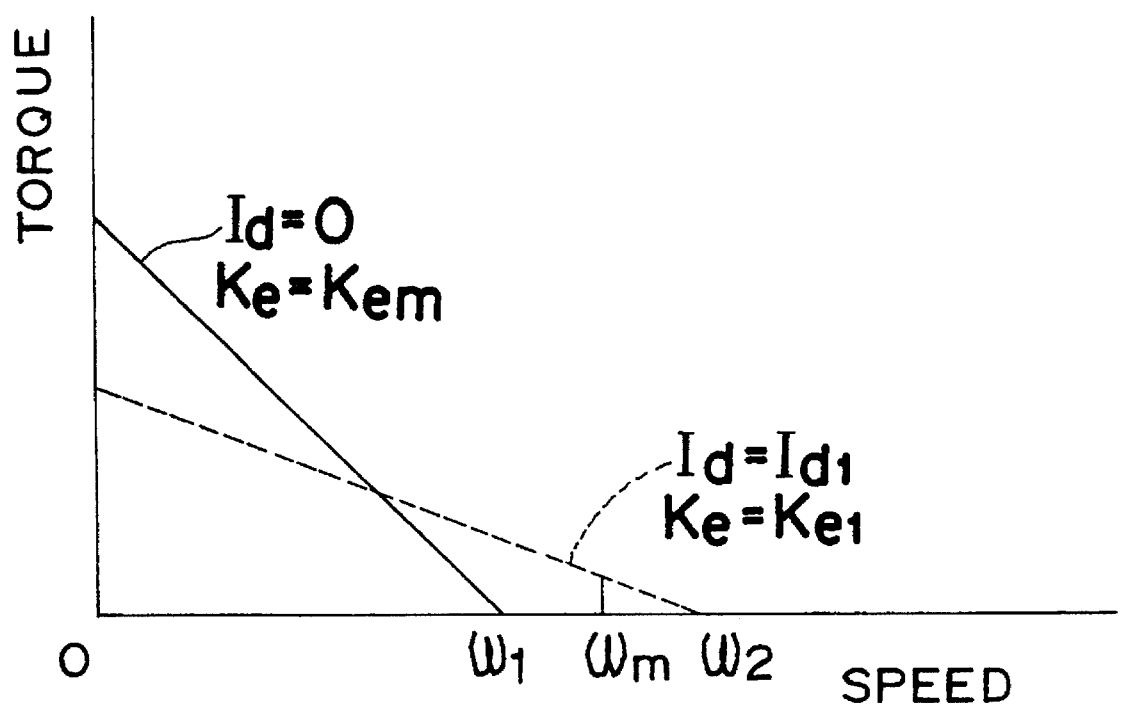
FIG. 20 is a speed-torque characteristic chart of a motor for explaining the disadvantage of overcharge of the primary battery.
Figure 21:
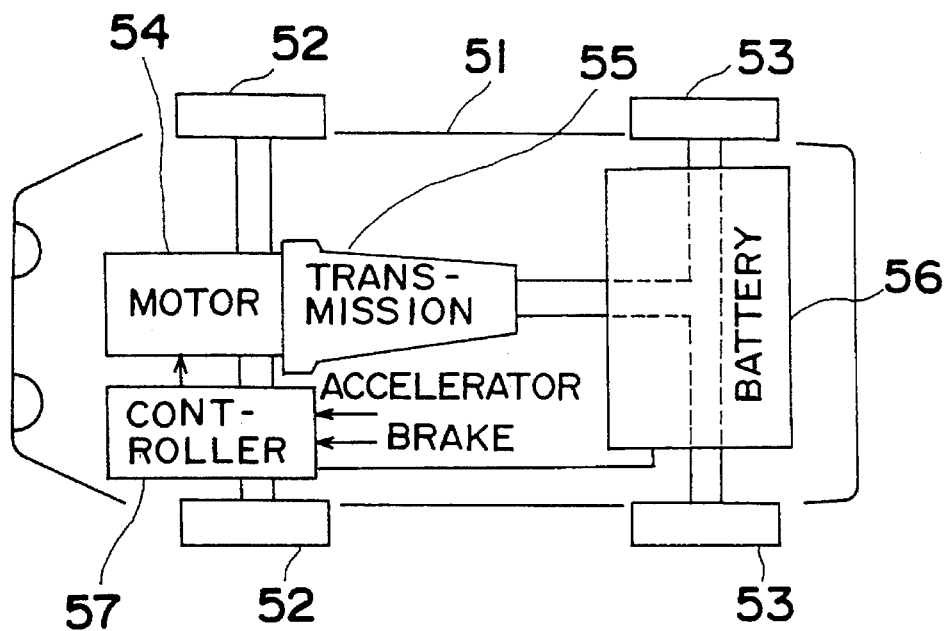
FIG. 21 is a schematic arrangement view of an electromobile.
Figure 22:
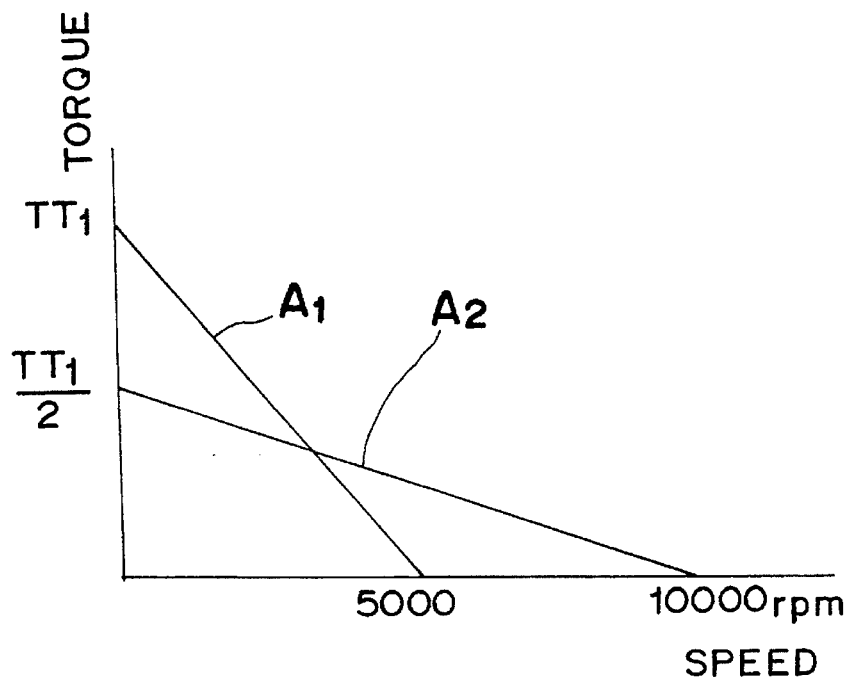
FIG. 22 is a torque-speed characteristic chart showing an aspect of the field-weakening control of a motor.

The above-described arrangement is similar to the conventional counterpart. The arrangement as it is has some disadvantages as described below. FIG. 20 is a torque-speed characteristic chart of the motor 73 in an electromobile having the above-described arrangement. In FIG. 20, the solid line represents a torque-speed characteristic chart in a state that no field-weakening current $I_d$ is flowing ($I_d=0$), i.e., a torque-speed characteristic chart that depends on the primary battery voltage and the motor constant, where the induced voltage constant $K_e$ in this case is designated as $K_{em}$ and the no-load rotational speed is $\omega_1$. The broken line represents a torque-speed characteristic chart in a state that a field-weakening current $I_d$ is flowing ($I_d=I_{d1}$), where the induced voltage constant $K_e$ in this case is designated as $K_{e1}$ and the no-load rotational speed is $\omega_2$.

Now assume that the motor 73 is rotating at a speed of $\omega_m$ with a field-weakening current $I_{d1}$ flowing. The induced voltage $V_{BEF}$ induced by the motor 73 is expressed by the following equation:

$$V_{BEF}=K_{e1}\times\omega_m \qquad (Eq. 44)$$

Also, the relationship between the induced voltage constant $K_{em}$ and $K_{e1}$ can be expressed by the following equation:

$$K_{e1}=(1-\omega_1/\omega_2)\times K_{em} \qquad (Eq. 45)$$

This is because the effective magnetic flux is canceled by the weakening factor $\omega_2/\omega_1$ and the weakening current $I_{d1}$.

The aforementioned induced voltage $V_{BEF}$, as far as the weakening current $I_{d1}$ is flowing, results in $$V_{BEF}\leq V_{Batt} \qquad (Eq. 46)$$

so that the charging current will not flow into the primary battery 77.

However, in the state that the motor 73 is rotating at the speed of $\omega_m$ with the weakening current $I_{d1}$ flowing, if the operator turns off the key switch 79 so that the controller 71 is interrupted from being powered from the control battery 78, i.e., if the control power supply is interrupted so that the weakening current $I_d$ is stopped from flowing, the induced voltage constant of the motor 73 changes from $K_{e1}$ to $K_{em}$, in which case if the motor 73 rotates at the speed of $\omega_m$, the induced voltage $V_{BE}$ induced by the motor 73 results in $$V_{BE}=K_{em} \times \omega_m \qquad \text{(Eq. 47)}$$

and satisfies $$V_{BE} > V_{Batt} \qquad \text{(Eq. 48)}$$

As a result, if the internal resistance of the primary battery 77 is $R_B$ and the charging current is $I_C$, then the following current $$I_C = (V_{BE} - V_{Batt})/R_B \qquad \text{(Eq. 49)}$$

returns to the primary battery 77. Accordingly, as a large weakening current flows, the resulting induced voltage $V_{BE}$ is large and therefore the charging current becomes large. This may cause the primary battery 77 to be considerably deteriorated in characteristics.

To solve such advantages, the ninth embodiment has an arrangement as described below.

This electromobile, as shown in FIG. 19, is put into operation in response to a turn-on of the key switch 79. A torque current and a field-weakening current shifted in phase 90° relative to the torque current flow to the motor 73 from the primary battery 77, so that the electromobile having the controller 71 for controlling the speed of the motor 73 is protected. A protective switch 80 such as a relay contact is connected to the key switch 79 in parallel. As built-in functions of the controller 71, a decision means 71a and a protective-switch drive means 71b are provided. Further, although not shown, alarm means 81 such as a buzzer or a lamp is provided.

The decision means 71a normally monitors the speed of the motor 73, the presence or absence of the field-weakening current, and its value. The decision means 71a has a function of deciding whether or not the induced voltage of the motor 73 has come to such a state that an overcharging current is flowing in the primary battery 77, when the key switch 79 is turned off with the field-weakening current interrupted. The protective-switch drive means 71b has a function of feeding to the protective switch 80 a protection signal to turn on the protective switch 80 in response to an AND-condition of an overcharge decision signal of the decision means 71a and a turn-off of the key switch 79. The protective-switch drive means 71b further has a function of activating the alarm means 81.

According to this protection apparatus for electromobiles, in such an operation state that, when the key switch 79 is turned off with the field-weakening current interrupted, the induced voltage of the motor 73 makes an overcharging current flow in the primary battery 77, even if the operator misoperates to turn off the key switch 79, the protective-switch drive means 71b turns on the protective switch 80, whereby the controller 71 can be prevented from halting its operation at a turn-off of the key switch 79. As a result, even if the key switch 79 is turned off, the controller 71 continues to operate without the field-weakening current being interrupted, so that no overcharging current flows in the primary battery 77, the primary battery 77 can be protected to prevent the characteristics from being deteriorated, and that the safety can be ensured. Further, the operator will be informed by the alarm means 81 of the fact that the key switch 79 has been turned off in spite of the state that the induced voltage of the motor 73 makes an overcharging current flow in the primary battery 77, whereby further safety can be attained.

It is noted that the alarm means 81 may be omitted.

According to the protection apparatus for electromobiles of the ninth embodiment, in such an operation state that, when the key switch is turned off with the field-weakening current interrupted, the induced voltage of the motor makes an overcharging current flow in the primary battery, even if the key switch is turned off, the protective-switch drive means turns on the protective switch, whereby the controller can be prevented from halting its operation at a turn-off of the key switch. Thus, even if the key switch is turned off, the controller can continue to operate without the field-weakening current being interrupted, so that any overcharging current is prevented from flowing in the primary battery, and that the primary battery is protected, with safety ensured.

According to the protection apparatus for electromobiles of this embodiment, the operator will be informed by the alarm means of the fact that the key switch has been turned off in spite of the state that the induced voltage of the motor makes an overcharging current flow in the primary battery, whereby further safety can be attained.

Each of the first and second embodiment can be applied to the third through ninth embodiments to obtain the operations and effects of the corresponding embodiment.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A method for controlling a motor, comprising: a step of determining speed-torque characteristics of a motor which is to be controlled, in a state in which no field-weakening current is flowing and in a state in which a field-weakening current is flowing at one level, respectively;

a step of determining a first torque command current by calculation from a deviation between a speed command to the motor and a present speed of the motor;

a step of determining a torque that develops at the present speed in the state in which no field-weakening current is flowing on the speed-torque characteristic and a torque that develops at the present speed in the state in which the field-weakening current is flowed at one level on the speed-torque characteristic, respectively;

a step of calculating torque currents corresponding to the torques determined in the preceding step from the torques and torque constants of the speed-torque characteristics; and a step of comparing the first torque command current determined from the deviation between the speed command to the motor and the present speed of the motor, with the torque currents corresponding to the torques, respectively, and determining and outputting a second torque command current and a field-weakening current depending on whether or not the first torque command current falls upon a field-weakening range of torque currents corresponding to the torques.

2. The method as claimed in claim 1, wherein the motor is reduced in output by heat generation of the motor and returned back to a normal state of the motor by a system that utilizes field-weakening control to control the motor, the method further comprising:

a step of gradually decreasing the torque current with a value of the field-weakening current fixed;

a step of correcting the torque current while the field-weakening current is reduced;

a step of holding a final state for a specific time period;

a step of gradually increasing the torque current level with the field-weakening current value fixed; and a step of correcting the torque current while the field-weakening current level is increased.

3. The method as claimed in claim 1, wherein the motor is controlled by controlling regenerative braking force, the method further comprising:

a step of calculating a required field-weakening current from the speed of the motor and a speed-torque characteristic of the motor; and a step of calculating a torque current from the calculated field-weakening current value.

4. A method for controlling a motor, comprising:

a step of determining a torque command current by calculation from a deviation between a speed control to a motor which is to be controlled and a present speed of the motor;

a step of determining whether or not a sum of voltage vectors of the motor is within a restrictive circle that depends on an applied voltage to the motor, when the torque command current is set with no field-weakening current flowing and at the present speed; and a step of determining a field-weakening current and a torque current with a field-weakening factor varied, when the sum of the voltage vectors of the motor is out of the restrictive circle that depends on the applied voltage to the motor, on a condition that the sum of the voltage vectors of the motor is within the restrictive circle that depends on the applied voltage to the motor, and that the torque current is made equal to a value resulting from multiplying the torque command current determined from the speed deviation, with the field-weakening factor.

5. The method as claimed in claim 4, wherein the motor is controlled by controlling regenerative braking force, the method further comprising:

a step of calculating a required field-weakening current from the speed of the motor and a speed-torque characteristic of the motor; and a step of calculating a torque current from the calculated field-weakening current value.

6. An apparatus for controlling a motor, comprising:

a means for determining a torque command current by calculation from a deviation between a speed control to a motor which is to be controlled and a present speed of the motor;

a means for determining whether or not a sum of voltage vectors of the motor is within a restrictive circle that depends on an applied voltage to the motor, when the torque command current is set with no field-weakening current flowing and at the present speed; and a means for determining a field-weakening current and a torque current with a field-weakening factor varied, when the sum of the voltage vectors of the motor is out of the restrictive circle that depends on the applied voltage to the motor, on a condition that the sum of the voltage vectors of the motor is within the restrictive circle that depends on the applied voltage to the motor, and that the torque current is made equal to a value resulting from multiplying the torque command current determined from the speed deviation, with the field-weakening factor.

7. The apparatus as claimed in claim 6, wherein the motor is controlled by controlling regenerative braking force, the apparatus further comprising:

a means for calculating a required field-weakening current from the speed of the motor and a speed-torque characteristic of the motor; and a means for calculating a torque current from the calculated field-weakening current value.

8. An apparatus for controlling a motor, comprising:

a means for determining speed-torque characteristics of a motor which is to be controlled, in a state in which no field-weakening current is flowing and in a state in which a field-weakening current is flowing at one level, respectively;

a means for determining a first torque command current by calculation from a deviation between a speed command to the motor and a present speed of the motor;

a means for determining a torque that develops at the present speed in the state in which no field-weakening current is flowing on the speed-torque characteristic and a torque that develops at the present speed in the state in which the field-weakening current is flowing at one level on the speed-torque characteristic, respectively;

a means for calculating torque currents corresponding to the torques determined in the torque determining means from the torques and torque constants of the speed-torque characteristics; and a means for comparing the first torque command current determined from the deviation between the speed command to the motor and the present speed of the motor, with the torque currents corresponding to the torques, respectively, and determining and outputting a second torque command current and a field-weakening current depending on whether or not the first torque command current falls upon a field-weakening range of torque currents corresponding to the torques.

9. The apparatus as claimed in claim 8, wherein the motor is reduced in output by heat generation of the motor and returned back to a normal state of the motor by a system that utilizes field-weakening control to control the motor, the apparatus further comprising:

a means for gradually decreasing the torque current with a value of the field-weakening current fixed;

a means for correcting the torque current while the field-weakening current is reduced;

a means for holding a final state for a specific time period;

a means for gradually increasing the torque current level with the field-weakening current value fixed; and a means for correcting the torque current while the field-weakening current level is increased.

10. The apparatus as claimed in claim 8, wherein the motor is controlled by controlling regenerative braking force, the apparatus further comprising:

a means for calculating a required field-weakening current from the speed of the motor and a speed-torque characteristic of the motor; and a means for calculating a torque current from the calculated field-weakening current value.

11. The apparatus as claimed in claim 8, comprising:

an encoder provided to the motor;

a speed detection means for detecting a rotational speed of the motor from an output signal of the encoder;

a position detection means for detecting a position of a rotor of the motor from an output signal of the encoder;

an address generation means for generating a digital address signal corresponding to the position of the rotor of the motor in response to an output of the position detection means;

a speed control means for outputting a speed control command signal of a torque current axis which is hereinafter, referred to as a q-axis and a speed control command signal of a field-weakening current axis which is hereinafter, referred to as a d-axis, which orthogonally cross each other, in correspondence with a difference between a speed command input and an output signal of the speed detection means;

a q-axis waveform storage means and a d-axis waveform storage means for storing each one cycle of q-axis waveform data and d-axis waveform data for use of driving the motor, and for receiving inputs of digital address signals outputted from the address generation means as address inputs to read the q-axis waveform data and the d-axis waveform data for driving the motor, in correspondence with the rotor position of the motor;

a q-axis integrating D/A conversion means and a d-axis integrating D/A conversion means for adding up a q-axis speed control command signal and a d-axis speed control command signal outputted from the speed control means to the q-axis waveform data and the d-axis waveform data for driving the motor outputted from the q-axis waveform storage means and the d-axis waveform storage means, respectively, and for performing D/A conversion upon addition results;

a d-axis and q-axis addition means for adding and synthesizing output signals of the q-axis integrating D/A conversion means and the d-axis integrating D/A conversion means;

a current control circuit for outputting an error signal between an output signal of the d-axis and q-axis addition means and a detection signal of a load current flowing in the motor;

a pulse-width modulation (hereinafter, referred to as PWM) control circuit for generating a pulse-width modulation signals correspondingly to an output signal of the current control circuit; and a PWM inverter for driving the motor with an output signal of the PWM control circuit.

12. The apparatus as claimed in claim 11, further comprising:

a phase control circuit for storing phase correction data for correcting a change in phase lag due to a change in the rotational speed of the motor and for receiving an input of an output signal of the speed detection means and for outputting an output of phase correction data corresponding to the rotational speed of the motor; and a q-axis addition means and a d-axis addition means for adding the phase correction data outputted from the phase control circuit to the digital address signal outputted from the address generation means and for feeding addition results to the q-axis waveform storage means and the d-axis waveform storage means.

13. The apparatus as claimed in claim 11, further comprising:

an induced voltage detector for detecting an induced voltage of the motor;

an induced-voltage decision means for comparing the induced voltage of the motor detected by the induced voltage detector with a target induced voltage and for making a decision in response to the comparison;

a phase control circuit for outputting phase correction data corresponding to an output signal of the induced-voltage decision means;

a q-axis addition means and a d-axis addition means for adding phase correction data outputted from the phase control circuit to the digital address signal outputted from the address generation means and for feeding an addition result to the q-axis waveform storage means and the d-axis waveform storage means, whereby the induced voltage of the motor is approximated to the target induced voltage.

14. The apparatus as claimed in claim 11, wherein the q-axis waveform data and the d-axis waveform data for driving the motor, which have been stored in the q-axis waveform storage means and the d-axis waveform storage means, respectively, are waveform data of approximately a trapezoidal wave in which a specified harmonic component has been added to a fundamental-wave component.

15. The apparatus as claimed in claim 8, with which an electromobile having a protection apparatus is provided, the protection apparatus protecting an electromobile having a controller which is put into operation in response to a turn-on of a key switch and which controls a speed of a motor by controlling a flow of a torque current and a field-weakening current in the motor from a primary battery;

the protection apparatus comprising a protective switch provided in parallel to the key switch; and the controller having a decision means which monitors the speed of the motor, presence or absence of the field-weakening current, and its value, and which decides whether or not an induced voltage of the motor has come to such a state that an overcharging current is flowing in the primary battery, when the key switch is turned off with the field-weakening current interrupted; and a protective-switch drive means for turning on the protective switch in response to an AND-condition of an overcharge decision signal of the decision means and a turn-off of the key switch.

16. The apparatus as claimed in claim 15, wherein the protection apparatus further comprises an alarm means which is activated by the protective-switch drive means.

* * * * *